US009558205B2

(12) United States Patent
Kamei et al.

(10) Patent No.: US 9,558,205 B2
(45) Date of Patent: *Jan. 31, 2017

(54) METHOD FOR CREATING CLONE FILE, AND FILE SYSTEM ADOPTING THE SAME

(71) Applicant: HITACHI, LTD., Tokyo (JP)

(72) Inventors: Hitoshi Kamei, Tokyo (JP); Takaki Nakamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 14/617,198

(22) Filed: Feb. 9, 2015

(65) Prior Publication Data
US 2015/0220563 A1 Aug. 6, 2015

Related U.S. Application Data

(63) Continuation of application No. 13/259,672, filed as application No. PCT/JP2011/005192 on Sep. 14, 2011, now Pat. No. 9,092,153.

(51) Int. Cl.
*G06F 7/00* (2006.01)
*G06F 17/30* (2006.01)
*G06F 3/06* (2006.01)

(52) U.S. Cl.
CPC ......... *G06F 17/30203* (2013.01); *G06F 3/061* (2013.01); *G06F 3/065* (2013.01); *G06F 3/067* (2013.01); *G06F 3/0643* (2013.01); *G06F 17/3023* (2013.01); *G06F 17/30088* (2013.01); *G06F 17/30117* (2013.01); *G06F 17/30215* (2013.01)

(58) Field of Classification Search
CPC .................................................. G06F 17/3023
See application file for complete search history.

(56) References Cited

U.S. PATENT DOCUMENTS

| 6,473,775 B1 | 10/2002 | Kusters et al. |
| 7,409,511 B2 | 8/2008 | Edwards et al. |
| 2004/0267836 A1 | 12/2004 | Armangau et al. |
| 2009/0013009 A1 | 1/2009 | Nakayama |
| 2014/0057620 A1 | 2/2014 | Lin |

FOREIGN PATENT DOCUMENTS

EP 2675110 A2 12/2013

OTHER PUBLICATIONS

Miyamoto, Kunio, "Xen Tettei Nyumon," Second Edition, Shoeisha Co., Ltd., Sep. 14, 2009 (pp. 326-329) with English translation of excerpts.

(Continued)

*Primary Examiner* — Ajith Jacob
(74) *Attorney, Agent, or Firm* — Volpe and Koenig, P.C.

(57) ABSTRACT

In the prior art clone creating technique of a file, a management table of a snapshot and the file was created when creating the clone file, so that a considerable amount of creation time for creating the clone file and storage capacity was required. In order to solve the problems of the prior art, the present invention provides a system wherein if a request to create a clone of a file is received, a differential file is created while inhibiting update of the file, and update data is written to the differential file. Further, when a first update request is received to the differential file after creating the differential file, a management table is created. According to the invention, a large amount of clone files can be created speedily.

18 Claims, 25 Drawing Sheets

(56) References Cited

OTHER PUBLICATIONS

Abe, Yoshifumi, "Complete Coverage of Leading-Edge Storage Technologies Supporting the Cloud Era," Monthly ASCII.Technologies, Japan, ASCII Media Works, Inc., Feb. 1, 2010, vol. 15, Second Issue (pp. 76-83) with English translation of excerpts.
Taira, Hajime, "KVM Tettei Nyumon," Shoeisha Co, Ltd., Jul. 7, 2010 (pp. 143-146) with English translation of excerpts.

Fig. 11
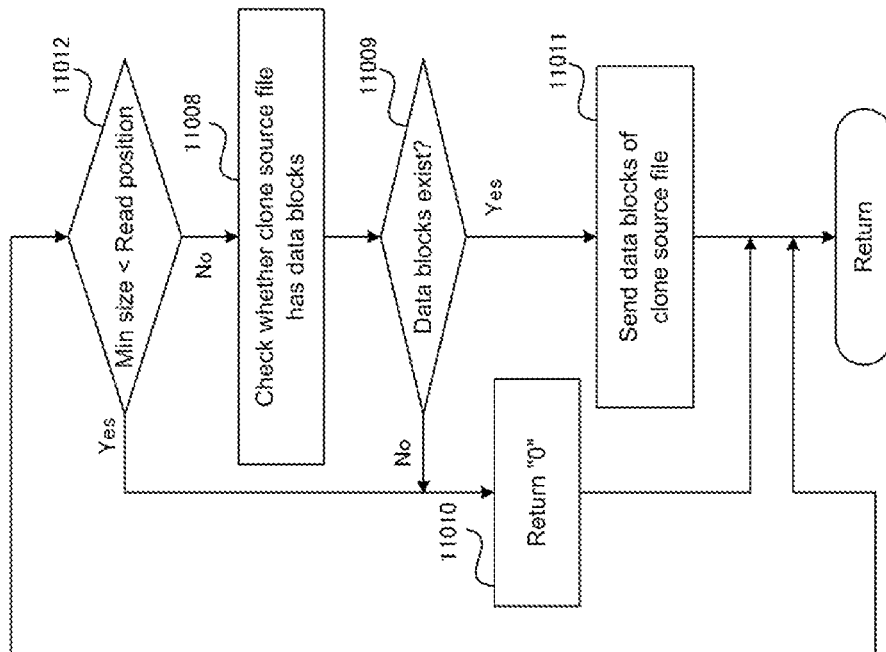
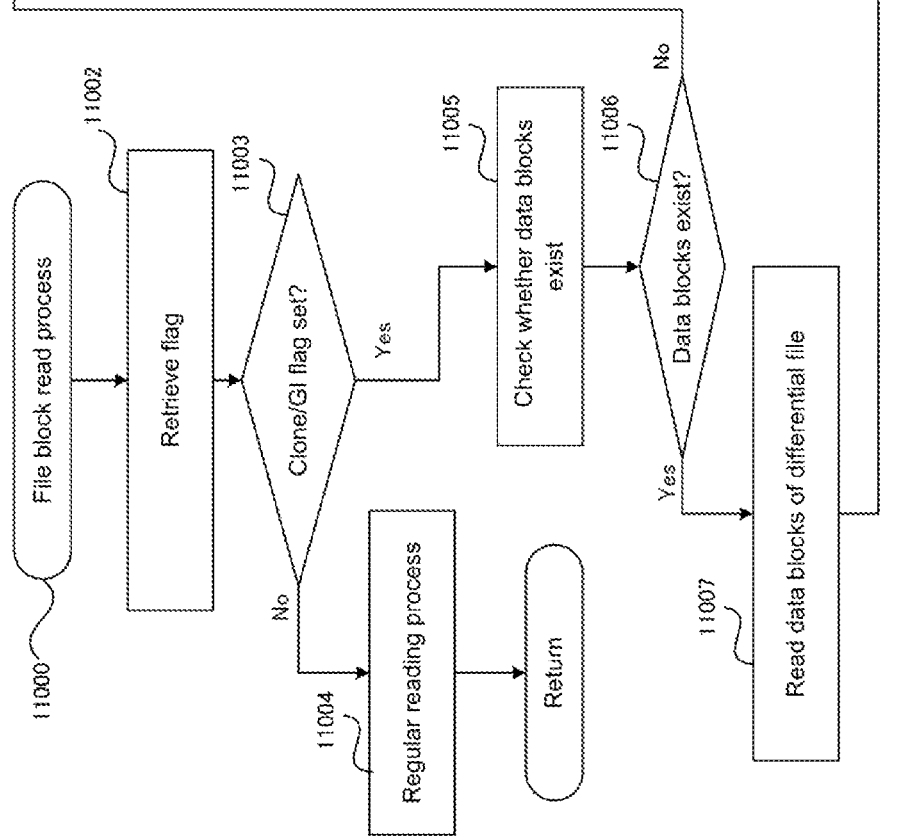

METHOD FOR CREATING CLONE FILE, AND FILE SYSTEM ADOPTING THE SAME

TECHNICAL FIELD

The present invention relates to a file system having a file cloning function, and a method for enhancing the performance of creation of clone files.

BACKGROUND ART

Recently, the use of VMs (Virtual Machines) have spread widely along with the advancement of virtualization technology, a typical example of which is a VDI (Virtual Desktop Infrastructure). In order to utilize VMs speedily, it is common to copy virtual disk files having installed OS (Operating System) environments.

However, since the size of virtual disk files may be as large as a few GB (Giga Bytes), the process for physically copying the files may take approximately tens of seconds to even tens of minutes. Therefore, a file cloning technique capable of virtually copying the virtual disk files so as to cut down the time required for the copying process is drawing attention (patent literature 1).

CITATION LIST

Patent Literature

[PTL 1]
U.S. Pat. No. 7,409,511

SUMMARY OF INVENTION

Technical Problem

Patent literature 1 discloses an art of creating a clone which is a writable copy of a parent virtual volume. According to the art disclosed in patent literature 1, a snapshot of the patent virtual volume and a virtual volume functioning as the clone are created, and a modified data of the snapshot is differentially managed in a different file (differential file). The differential file has no data blocks immediately after creation but a management table of the data blocks is created. Physical block numbers or the like are stored in the field of the data block management table, and the initial value thereof is "0". When a file is accessed in which the field of the data block management table is "0", the snapshot data is referred to.

According to the disclosed file cloning function, there were drawbacks in the performance of creating clone files since file management tables for managing file blocks and management tables associating the logical blocks with the physical blocks were created. In other words, the prior art cloning function had the following two problems.

(a1) A snapshot must be created in order to create a clone.
(a2) Management tables are created before update of the clone occurs, but if the file has a large size, the capacity of the file management table must also be large, so that the creation of clones requires a long time.

As a result, upon creating a few hundred to a few thousand clone files, the performance for creating clone files was deteriorated and the creation required a very long time.

Solution to Problem

Thus, the present invention adopts the following two methods to realize high speed creation of clone files.

(b1) When a request to create a clone of a file is received, the update of the file is prohibited, a differential file is created, and update data is written to the differential file.

(b2) After creating a differential file, when a first update request of the differential file is received, a management table is created.

Actually, the present invention provides a file server connected to a client terminal and a storage system, the file server comprising a processor, and a memory storing a file system program managing a file; wherein the file system program creates a first differential file while inhibiting update of the file upon receiving a request to create a clone of the file; and accesses the first differential file upon receiving a request to access the clone; wherein when the access is (1) an update request:

(1a) if a disk block of the storage system is not assigned to a file block of the first differential file designated via the update request, a disk block of the storage system is assigned to the file block and update data is written thereto;
(1b) if a disk block of the storage system is assigned to the file block, update data is written thereto;
wherein when the access is (2) a read request:
(2a) if data exists in the file block of the first differential file designated via the read request, the data is read therefrom; and
(2b) if there is no data in the file block, and if data exists in the file block corresponding to said file, the data is read therefrom, and
when an update request of said file occurs, a second differential file is created, and
a disk block of the storage system is assigned to the file block of the second differential file designated via the update request, and update data is written thereto.

According to another aspect of the present invention, the file system program creates a second differential file together with the first differential file regardless of whether an update request of the file occurs or not upon receiving a copy file creation request of the file, and accesses the second differential file upon receiving an access request to the file;
wherein when the access is (1) an update request:
(1a) if a disk block of the storage system is not assigned to a file block of the second differential file designated via the update request, a disk block of the storage system is assigned and update data is written thereto;
(1b) if a disk block is assigned to the file block, update data is written thereto;
wherein when the access is (2) a read request:
(2a) if data exists in the file block of the second differential file designated via the read request, the data is read therefrom; and
(2b) if there is no data in the file block, and if data exists in the file block corresponding to said file, the data is read therefrom.

According to yet another aspect of the present invention, the file system program creates a first data management table when a first update request is received to the first differential file after creating the first differential file; and stores in the first data management table an offset of a file data including the update data, a start block position of a disk block of the storage system assigned to the file block of the first differential file designated via the update request, and a data block length of the file.

Advantageous Effects of Invention

As described, when a clone file is created, there is no need to create a snapshot, so that the clone files can be created speedily. Furthermore, since a management table is created after the occurrence of update of the clone file, there is no need to allocate unnecessary capacities prior to update, and capacity consumption can be reduced.

BRIEF DESCRIPTION OF DRAWINGS

FIG. 11 is a flowchart showing an example of operation for reading files via the file system program.

DESCRIPTION OF EMBODIMENTS

Now, the preferred embodiments of the present invention will be described with reference to the drawings, but the scope of the present invention is not restricted to these embodiments.

Embodiment 1

Figure 1:
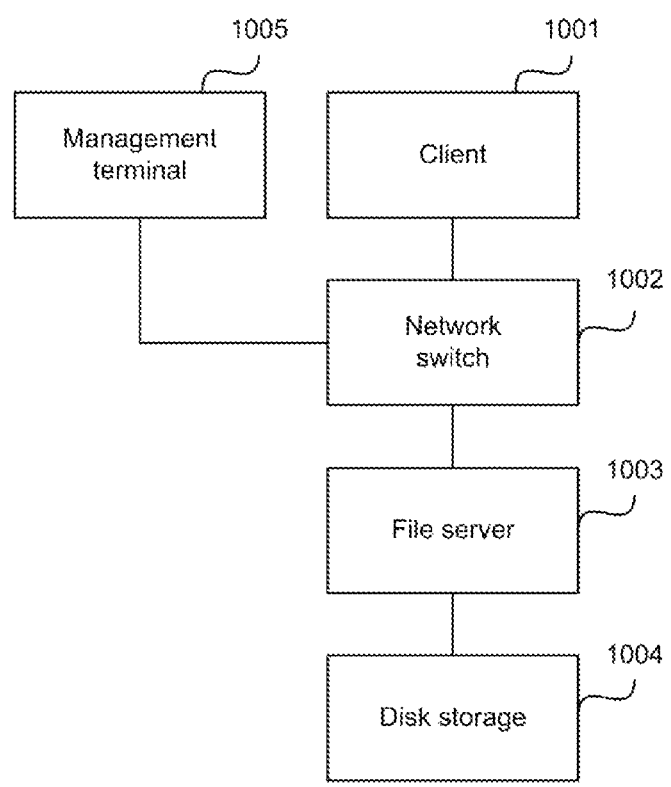
FIG. 1 is a block diagram showing an example of the structure of the present invention.

Now, a first embodiment of the present invention will be described with reference to FIGS. 1 through 18. First, the configuration of the present invention will be described with reference to FIGS. 1 through 5. FIG. 1 is a block diagram showing an example of configuration of a file sharing system according to the present invention. A client 1001 is a computer that an end user utilizing the file sharing system uses. The internal configuration of the client 1001 and the operations of internal processes will be described later (with reference to FIG. 2).

A network switch 1002 is a device that is capable of connecting the client 1001, a management terminal 1005 and a file server 1003 via a LAN (Local Area Network). However, the form of connection according to the present invention is not restricted thereto, and the LAN can be realized by applying wireless communication apparatuses or the like. The file server 1003 is a computer providing a file sharing service to end users using the client 1001. The internal configuration and the internal processes thereof will be described in detail later. A disk storage 1004 is a disk system for retaining file data stored in the file server 1003.

The file server 1003 and the disk storage 1004 are connected via a FC (Fibre Channel) protocol. Other protocols such as iSCSI (Internet Small Computer System Interface) can also be used for connecting the file server 1003 and the disk storage 1004. The present invention does not restrict the form of connection of the file server 1003 and the disk storage 1004. The management terminal 1005 is a computer that system administrators use for managing the file sharing system according to the present invention. The internal configuration and the internal processes of the management terminal 1005 will be described in detail later (with reference to FIG. 5).

Figure 2:
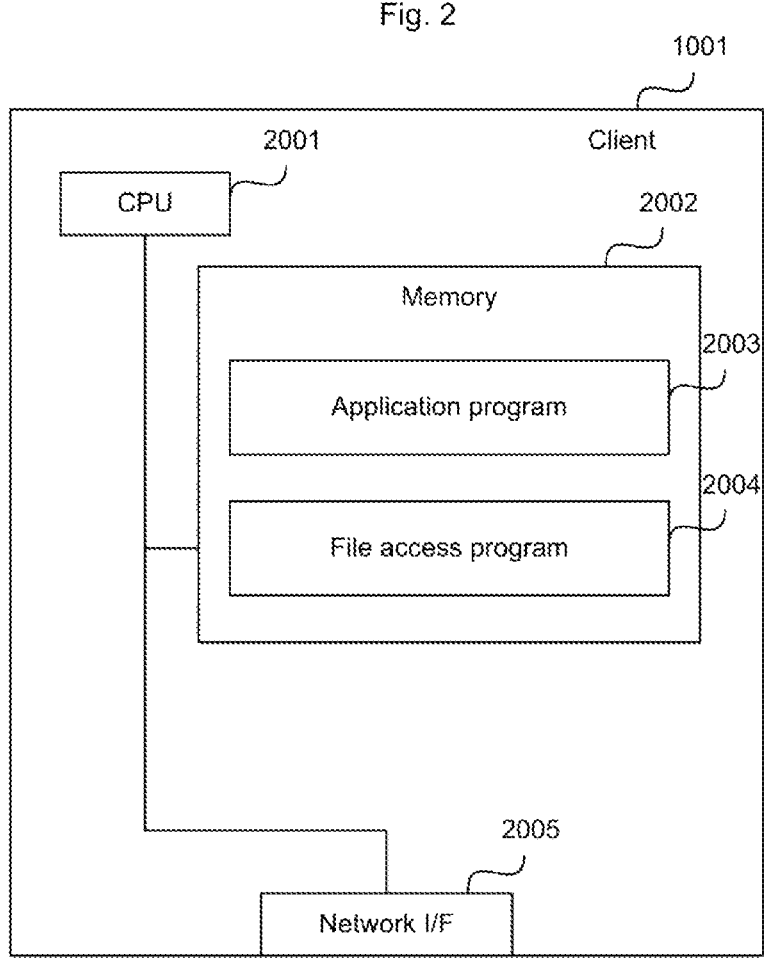
FIG. 2 is a block diagram showing an example of the client structure.

FIG. 2 is a block diagram showing an example of the internal configuration of the client 1001 according to the present invention. The client 1001 comprises a CPU 2001, a memory 2002 and a network interface 2005, which are mutually connected via internal communication paths. The CPU 2001 executes the application program 2003 and the file access program 2004 stored in the memory 2002. The application program 2003 is a program used by end users, such as a spreadsheet program.

The file access program 2004 is a program enabling the file server 1003 to access the file sharing service provided to end users. When the application program 2003 accesses files in the file server 1003 via the LAN, the file access program 2004 sends a file access request to the file server 1003. Then, the file access program 2004 receives a file access data from the file server 1003 and transmits it to the application program 2003.

Figure 3:
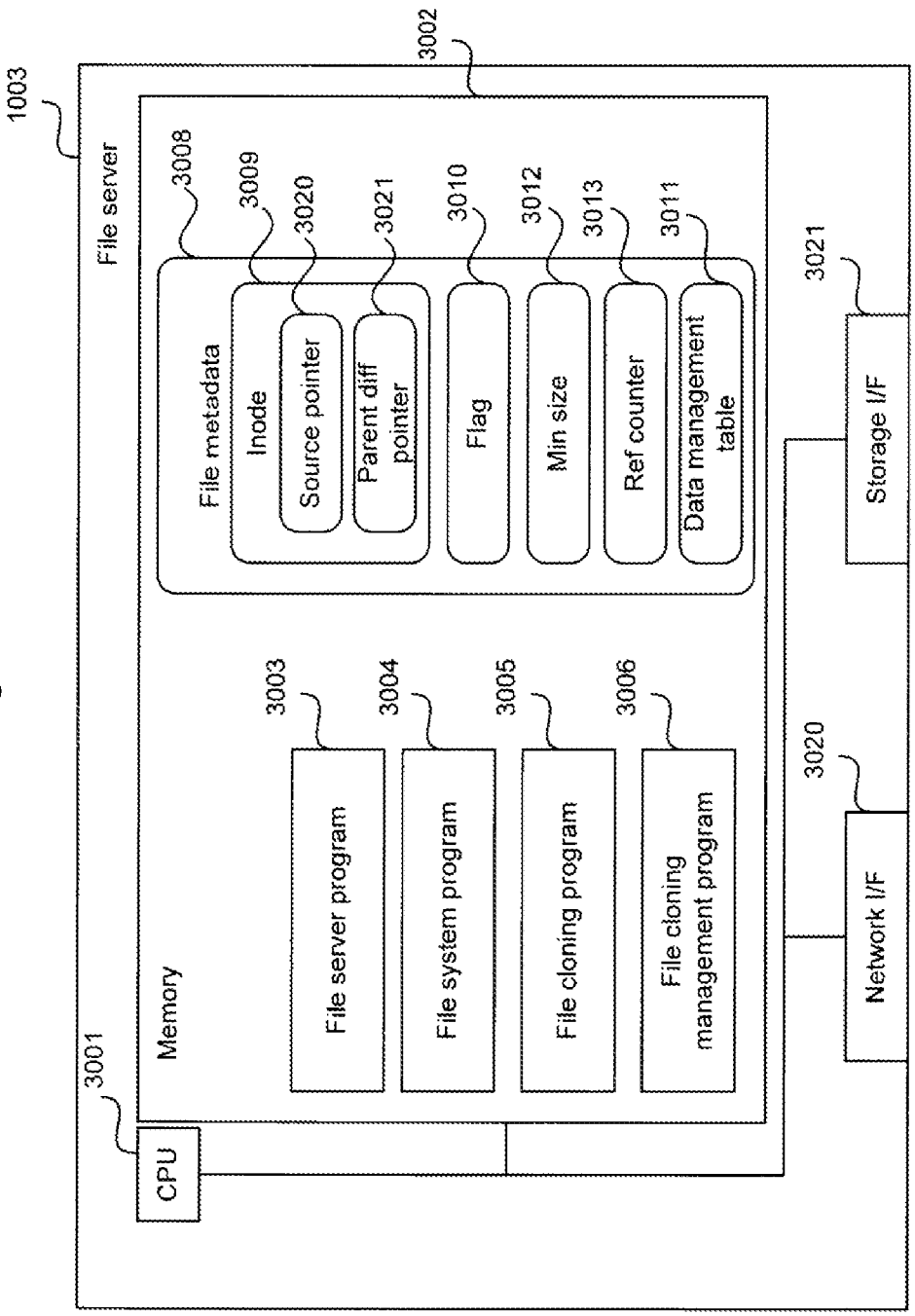
FIG. 3 is a block diagram showing an example of the file server structure.

FIG. 3 is a block diagram showing an example of the internal configuration of the file server 1003 according to the present invention. The file server 1003 is composed of a CPU 3001, a memory 3002, a network interface 3020 and a storage interface 3021, which are mutually connected via internal communication paths. The CPU 3001 executes a file server program 3003, a file system program 3004, a file cloning program 3005 and a file cloning management program 3006 stored in the memory 3002. The above-mentioned group of programs can be stored in disks (not shown) and arbitrarily read for execution.

The memory further retains a file metadata 3008 and a data management table 3011 storing data block information of files. As described in further detail in FIG. 7, the file metadata 3008 and the data management table 3011 are created for respective files. Further, the file metadata 3008 and the data management table 3011 are stored in a disk 4005 of a disk system 1004 so that they can be loaded after rebooting the file server 1003.

The file metadata 3008 includes an inode 3009 which is a file management information having file sizes and access permission flags, a flag 3010 retaining the attribute of clone files, a minimum size 3012 storing a data size in which files are cut into minimum (after deleting a data) sizes, and a reference counter 3013 holding the number of clone child differential files referring to a clone source file.

Figure 6:
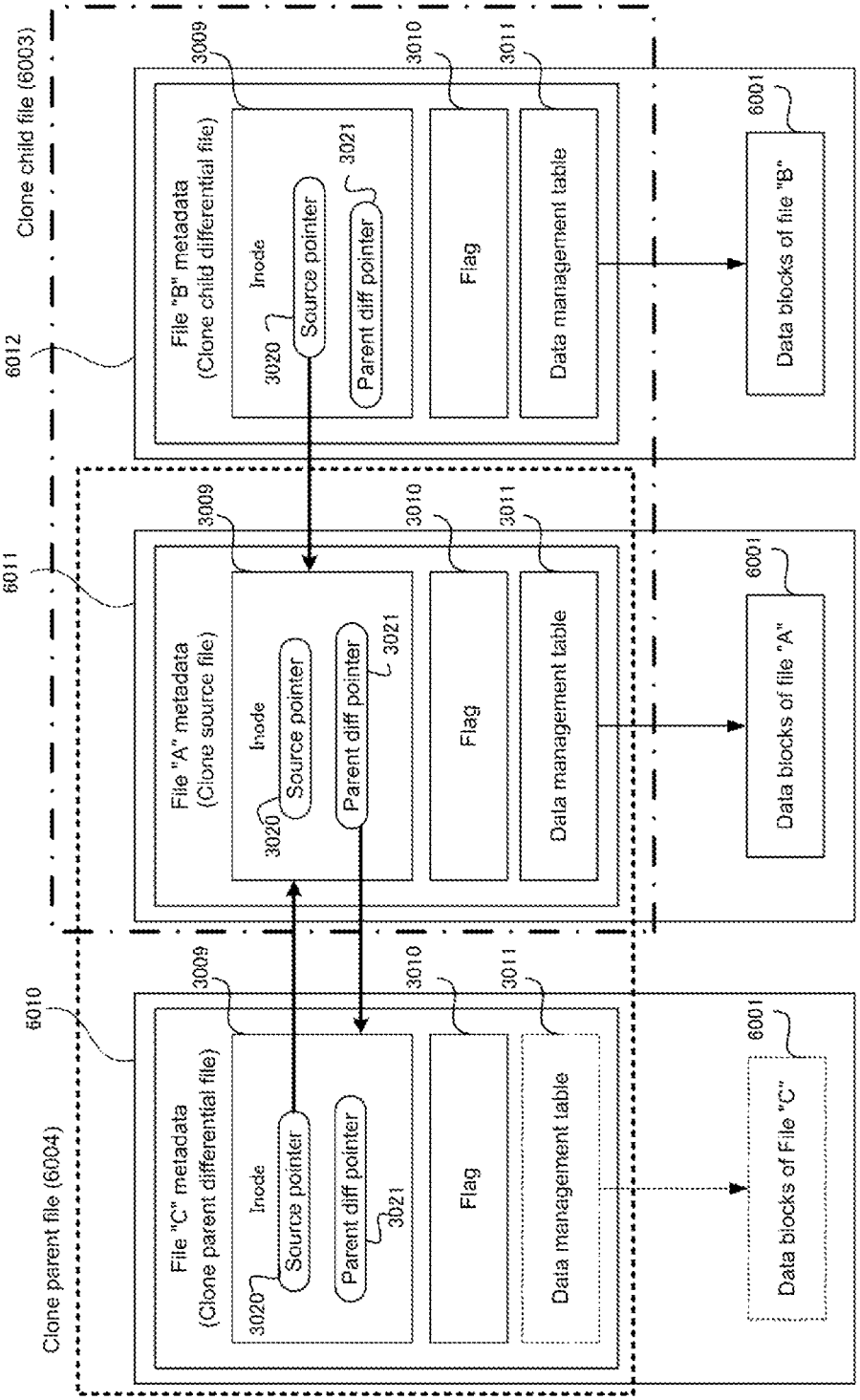
FIG. 6 is a block diagram showing an example of relationship of clone files.

According to the present invention, the inode 3009 holds, other than the file management information, a source pointer 3020 pointing to a clone source file 6011 and a parent differential pointer 3021 pointing to a clone parent differential file 6010 described in further detail in FIG. 6. The source pointer 3020 and the parent differential pointer 3021 stores, for example, an inode number which is a number uniquely assigned to respective inodes. However, the inode numbers are not necessarily indispensable, as long as the inodes are identifiable using information stored in 3020 and 3021. The file cloning function realizes the cloning function using these data. The detailed use of these data will be described in detail later. Further, the above-described data and tables can be stored in disks (not shown) and read therefrom arbitrarily when necessary, or can be stored in disks and used.

The file server program 3003 receives a file access request from the file access program 2004 of the client 1001. The file server program 3003 is a program that uses the file system program 3004 to access data of files stored in the disk storage 1004. At that time, if the file to be accessed is a clone file, the file system program 3004 executes processes for clone files. The contents of processes of the file server 1003 will be described in detail later.

Figure 4:
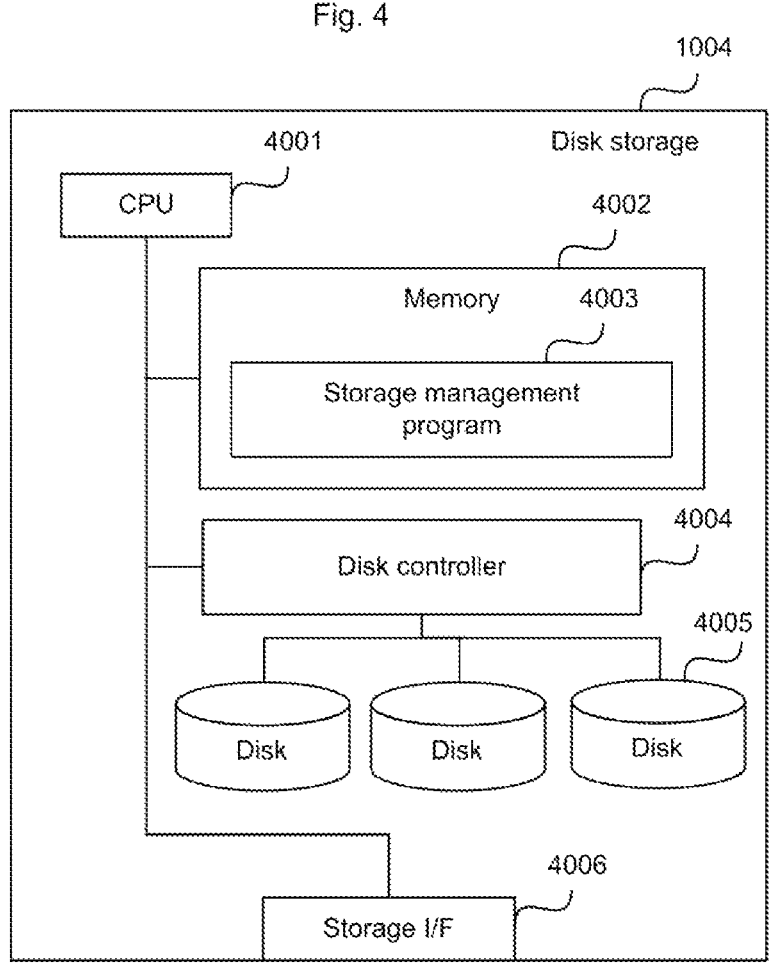
FIG. 4 is a block diagram showing an example of the disk storage structure.

FIG. 4 is a block diagram showing the internal configuration of the disk storage 1004 according to the present invention. The disk storage 1004 includes a CPU 4001, a memory 4002, a disk controller 4004 and a storage interface 4006, which are mutually connected via internal communication paths. The disk controller 4004 is further connected with disks 4005, and controls the disks 4005. The disk controller 4004 has a RAID (Redundant Arrays of Inexpensive Disks) function, and enhances the fault tolerance of the disk unit through redundancy of multiple disks 4005.

The CPU 4001 executes a storage management program 4003 stored in the memory 4002. The storage management program 4003 is a program for managing the RAID function of the disk controller 4004. For example, the configuration of the redundant disk unit is set. According to the present invention, the disk storage 1004 can also be a particular kind of storage unit or a storage unit without a redundancy function. Further, the disk storage 1004 can adopt optical disks or tape units. In other words, the present invention does not restrict the storage device storing the file data.

Figure 5:
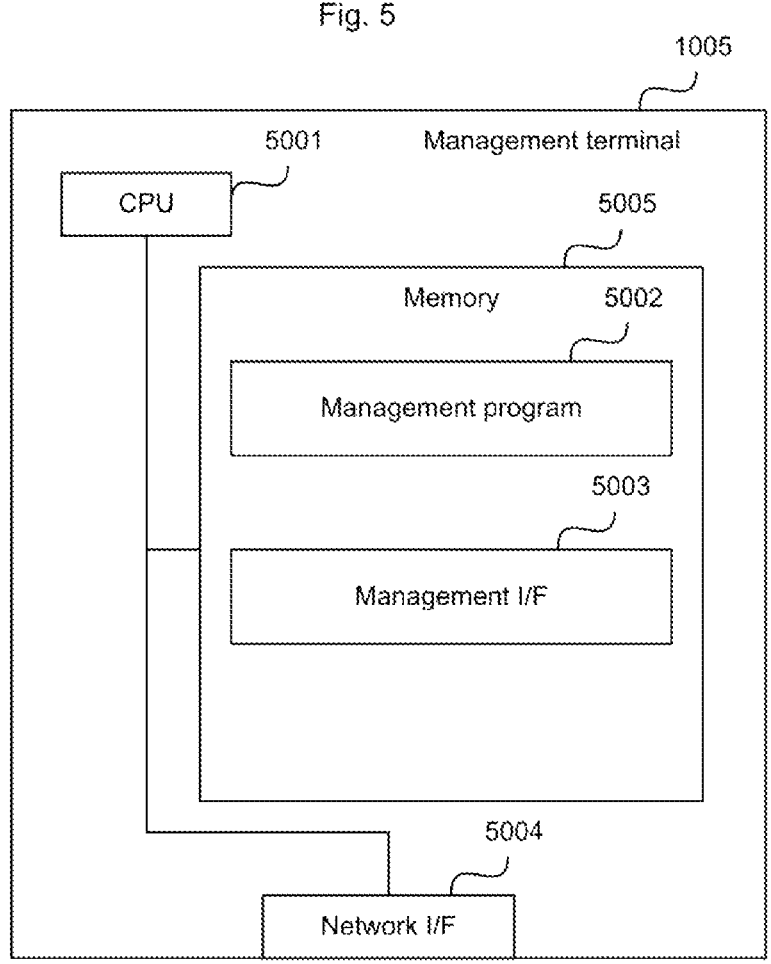
FIG. 5 is a block diagram showing an example of the management terminal structure.

FIG. 5 is a block diagram illustrating one example of an internal configuration of the management terminal 1005 according to the present invention. The management terminal 1005 includes a CPU 5001, a memory 5005 and a network interface 5004, which are mutually connected via internal communication paths. The CPU 5001 executes a management program 5002 and a management interface 5003 stored in the memory 5005.

The management program 5002 is a program for providing to a system administrator the function for managing the file sharing system according to the present invention through the management interface 5003. When the system administrator enters management information to the management interface 5003, the management information is transmitted to the management program 5002. The management program 5002 sets the file server 1003 based on the received management information. The details of the process contents of the management program 5002 and the management interface 5003 will be described later.

Next, the structure of clone files will be described. FIG. 6 is a view illustrating the relationship between clone files according to the present invention. The file cloning function according to the present invention defines the clone files by dividing the files into a clone parent file 6004 and a clone child file 6003. The clone parent file 6004 represents the same file as the file to be cloned. The clone parent file 6004 is composed of a clone source file 6011 and a clone parent differential file 6010. The clone parent file 6004 behaves as the source file of the clone file. That is, when the client 1001 accesses the source file of the clone file, the access is actually performed to the clone parent file 6004.

When the client 1001 accesses the clone parent file 6004, the file system program 3004 accesses the clone source file 6011. At the same time, the file system program 3004 also accesses the clone parent differential file 6010. If the client 1001 writes data into the clone parent file 6004 (that is, if data is written into the clone source file 6011) the file system program 3004 writes that data into the clone parent differential file.

In order to realize this process, upon opening the clone source file 6011, the file system program 3004 sets an inode number of the clone parent differential file 6010 to a parent differential pointer 3021 in the inode 3009 of the clone source file 6011. Thereafter, the file system program 3004 opens the clone parent differential file 6010 and sets the inode number of the clone source file 6011 to a source pointer 3020 in the inode 3009 of the clone parent differential file 6010.

When the client 1001 attempts to write data into the clone source file 6011 (that is, when the client attempts to write data into the clone parent file 6004), the file system program 3004 acquires the clone parent differential file 6010 from the parent differential pointer 3021 and writes data into the clone parent differential file 6010. This process will be described in further detail later.

As described, according to patent literature 1, it was necessary to manage a snapshot that requires management and a clone. On the other hand, the present invention enables to realize a file cloning function without disclosing the clone parent differential file 6010 to the client 1001, so that management costs can be cut down.

According to the example of FIG. 6, the clone parent differential file 6010 does not have a data management table 3011. In other words, the clone parent differential file 6010 does not have data 6001. That is, the client 1001 has not written data into the clone parent file 6004 after the clone child file 6003 was created. As described, when clone files are created, the clone parent differential file 6010 neither has data nor a data management table 3011. Therefore, the clone parent differential file can be created speedily.

On the other hand, the clone child file 6003 is composed of a clone source file 6011 and a clone child differential file 6012. The clone child file 6003 behaves as a copy file of the clone source file 6011. When the client 1001 accesses the clone child file 6003, the file system program 3004 accesses the clone child differential file 6012. At that time, the file system program 3004 also accesses the clone source file 6011.

When the client 1001 writes data into the clone child file 6003, the file system program 3004 writes the data into the clone child differential file 6012. In order to realize this process, upon opening the clone child differential file 6012, the file system program 3004 sets an inode number of the clone source file 6011 to a source pointer 3020 in the inode 3009 of the clone child differential file 6012.

When the client 1001 attempts to write data into the clone child differential file 6012 (that is, when the client attempts to write data into the clone child file 6003), the file system program 3004 finds the clone source file 6011 according to the source pointer 3020. Then, the file system program 3004 writes the merged data of the clone source file 6011 and the write data into the clone child differential file 6012. These processes will be described in detail later.

According to the example of FIG. 6, when the client 1001 writes data into the clone child file 6003, a data management table 3011 is created in a file metadata 6012. The data management table 3011 designates data blocks 6002 of the clone child differential file in the disk 4005. Further, the data management table 3011 in the file metadata of the clone source file 6011 designates data blocks 6001 of the clone source file 6011. In order to show the relationship of files of the clone parent file 6004, the parent differential pointer 3021 of the Mode 3009 of the clone source file 6011 points to the Mode 3009 of the clone parent differential file 6010.

Similarly, the source pointer 3020 of the Mode 3009 of the clone parent differential file 6010 also designates the Mode 3009 of the clone source file 6011. On the other hand, in order to show the relationship of files of the clone child file 6003, the source pointer 3020 of the Mode 3009 of the clone child differential file 6012 points to the Mode of the clone source file 6011. Further, the Mode 3009 of the clone parent differential file 6010 denotes the Mode 3009 of the clone source file 6011. On the other hand, in order to show the relationship of files of the clone child file 6003, the Mode 3009 of the clone child differential file 6012 designates the Mode of the clone source file 6011.

The flags 3010 of the respective files 6010, 6011 and 6012 retain the flags representing the attribute of the files. The set flags are a GI (Golden Image) flag and a CLONE flag. Upon creating a clone child file, the file cloning program 3005 sets a GI flag to the flag 3010 of the clone source file 6011 indicating that the file is a clone source file.

Further, the program sets a CLONE flag to the flag 3010 of the clone child differential file 6012 and the flag 3010 of the clone parent differential file 6010 indicating that the files are clone differential files. These flags are used for specifying the process target files by the file system program 3004. In the case of the example of FIG. 6, data exists in the clone child differential file. However, if data is not written into the clone child file after creating the clone child differential file, neither data nor a data management table 3011 exists. Therefore, the clone child differential file can be created speedily.

As described, the relationship between clone files is formed. The operations of the respective files will be described in detail later. Further, FIG. 6 illustrates an example of creating one clone child file 6003. According to the present invention, the number of clone child files 6003 is not restricted, so more than one clone child files can be created. In the following description, the number of clone child files 6003 being created is one, similar to the example of FIG. 6.

Figure 7:
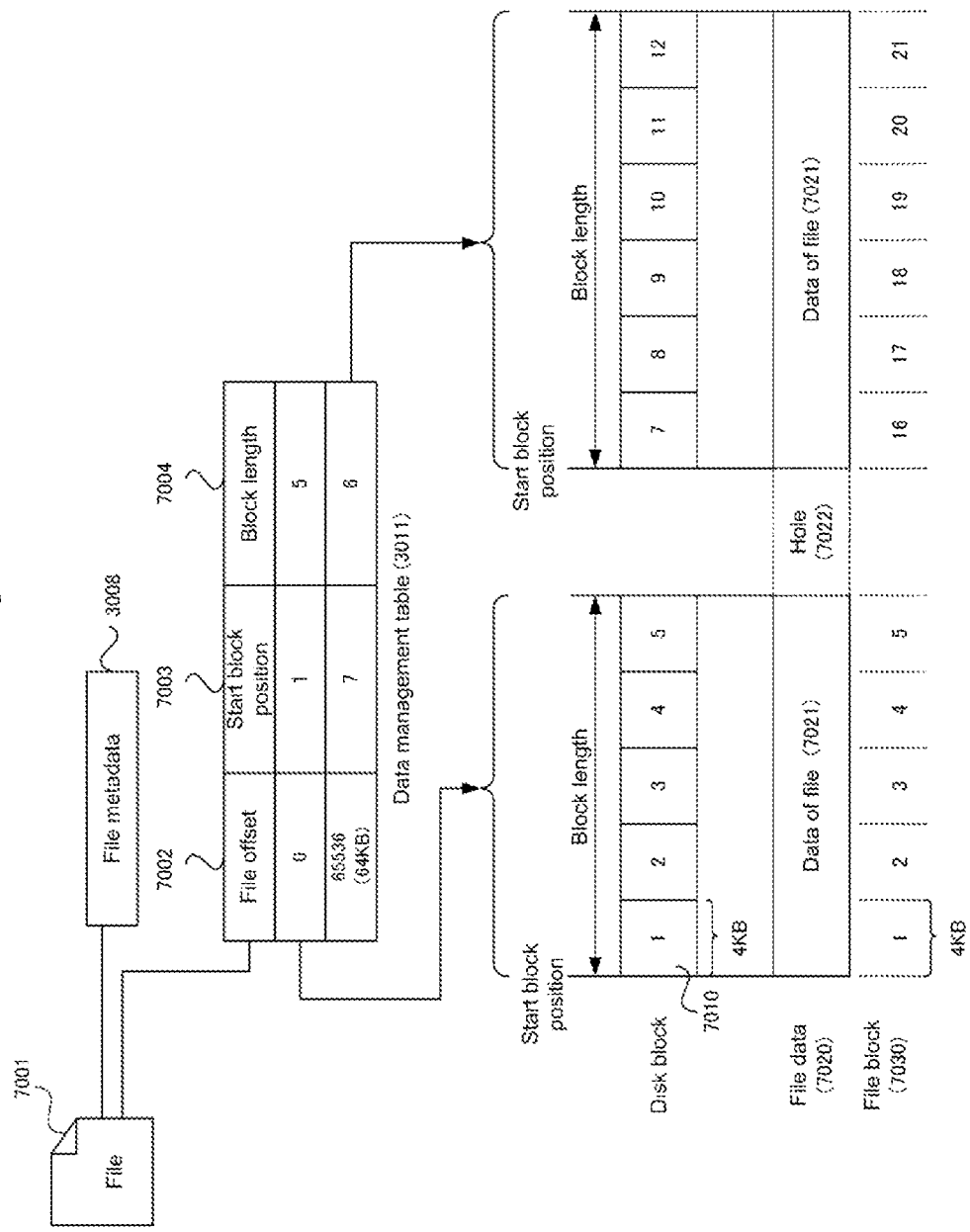
FIG. 7 is a block diagram showing the relationship of file management information.

FIG. 7 shows the relationship of a file 7001, a file metadata 3008, a data management table 3011 and the file data 7020 stored in a disk 4005. The file 7001 includes a file metadata 3008 and a data management table 3011. The size of the file 7001 is managed via units of logical file blocks 7030. For example, the first 4 kilobytes (KB) from the start of the file is managed as block 1, and the subsequent 4 kilobytes is managed as block 2. Further, unlike disk blocks 7010, file block numbers are also assigned to holes 7022 in logical file blocks 7030.

The disk 4005 is divided into disk blocks of specific sizes and managed. In the example shown in FIG. 7, the disk is divided into 4 KB unit disk blocks 7010 of file 7001. The data management table 3011 is a table for managing the file data 7020 in the file 7001. The respective records of the data management table 3011 include fields of a file offset 7002, a start block position 7003 and a block length 7004. The file offset 7002 shows the offset from the start of the file data 7020. The start block position 7003 stores the leading block number of the disk blocks 6001 storing the file data 7020. The block length 7004 stores the lengths of blocks 7010 of the file data 7020.

For example, if the file offset 7002 is "0", the start block position 7003 is "1" and the block length 7004 is "5", it means that the data starting from 0 bytes to 20 KB (=4 KB/block×5 blocks) of the file 7001 is stored from block number 1 to block number 5 of the disk 4005. Similarly, if the file offset 7002 is "65536", the start block position 7003 is "7" and the block length 7004 is "6", it means that data starting from the 65536th byte (64 KB) to 24 KB (=4 KB/block×6 blocks) is stored in six blocks from block number 7 to block number 12.

In the case of FIG. 7, the data of file 7001 includes a data area 7021 and holes 7022 of the file, as shown in file data 7020. Holes are data areas to which the blocks 7010 in the disk are not assigned. When the client 1001 reads the portion of the holes 7022 of the file 7001, the file system program 3004 returns "0" to the client 1001 since there is no corresponding block 7010.

The data management table 3011 is created when storing data in the disk. Similarly, when a new block is added and only when the blocks are discontinuous, a record is added to the data management table 3011. In the case of FIG. 7, when additional data is written into the file and block 13 is newly used, the value of the block length 7004 of the second record is incremented from "6" to "7".

On the other hand, if block 14 is to be used newly, it is possible to add a new record (third record). As described, by adding a new record to the data management table 3011 if necessary, management data that must be created simultaneously when a file is crated can be reduced, and a file can be created speedily.

Figure 8:
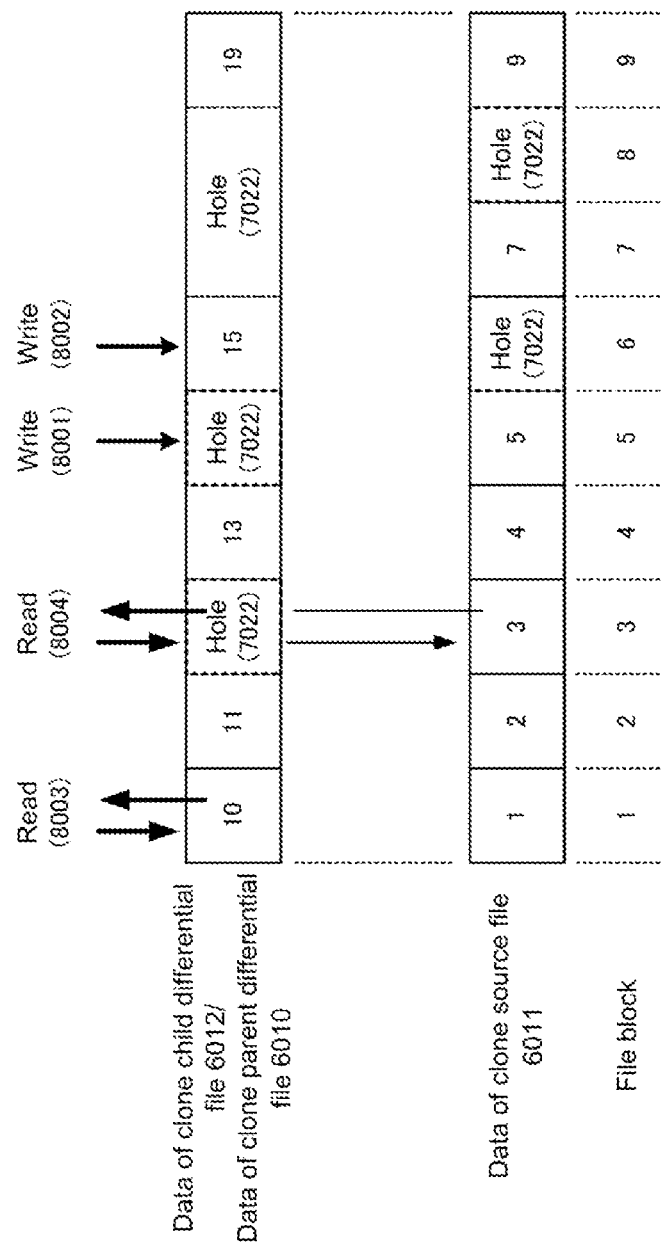
FIG. 8 illustrates the relationship of clone file data.

FIG. 8 is a drawing showing the association of data in a clone child file 6003 or a clone parent file 6004. The clone child file 6003 is structured by superposing a clone child differential file 6012 and a clone source file 6011. The holes of the clone child differential file 6012 are in a state in which no data are written thereto after the clone child file 6003 has been created (in other words, there is no differential information).

In FIG. 8, block number 10 is assigned to the clone child differential file 6012 and block number 1 is assigned to the clone source file 6011 in file block 1. Now, when the client 1001 reads the file block 1 of the clone child file 6003 (8003), the file system program 3004 reads the data in block number 10 of the clone child differential file 6012.

Further, the file block 3 of the clone child differential file 6012 corresponds to a hole 7022. However, block 3 is assigned to the clone source file 6011. Now, when the client 1001 reads file block 3 of the clone child file 6003 (8004), the file system program 3004 reads the data in block number 3 of the clone source file 6011.

When the client 1001 writes data into the clone child file 6003, data is written into the clone child differential file 6012. When writing data (8001), the client 1001 writes the data into the file block 5 of the clone child file 6003. In that case, a block is assigned to the clone child differential file 6012 and data transmitted from the client 1001 is written thereto.

When the client 1001 writes data into the file block 6 (8002), data is written into the disk area, since block number 15 is assigned to the clone child differential file 6012.

As described, when the client 1001 accesses the clone child file 6003, the file system program 3004 checks whether a block exists in the clone child differential file 6012, and when a block exists, the data in the block is processed.

On the other hand, if there is no block in the clone child differential file 6012, the file system program 3004 examines the block of the clone source file 6011. If a block exists in the clone source file 6011, the file system program 3004 processes the data in the block, and if not, the data is set to "0". Further, the same process is performed for the clone parent file 6004.

Figure 9:
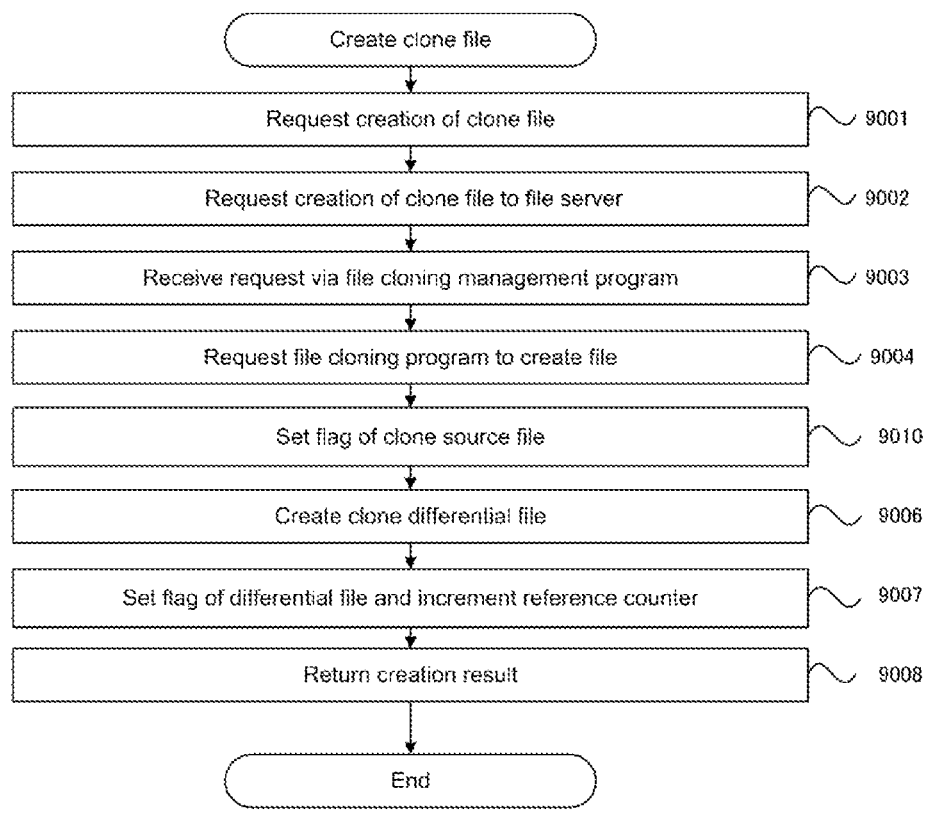
FIG. 9 is a flowchart showing an example of creation of clone files.

FIG. 9 is a flowchart showing the example of operation for creating a clone file. An end user using the client 1001 or an administrator of the file server 1003 creates a clone file using a management program 5002 of the management terminal 1005 (step 9001). The management program 5002 requests creation of a clone file to a file cloning management program 3006 in the file server 1003 through a management interface 5003 (step 9002).

The file cloning management program 3006 receives the clone file creation request (step 9003) and requests creation of a clone child file to the file cloning program 3005 (step 9004).

When the file cloning program 3005 receives the request for creating a clone child file, the program freezes the file becoming a clone source file 6011. Therefore, the file cloning program 3004 sets a GI flag as the flag 3010 of the file (step 9010). When the GI flag is set, the file system program 3004 prohibits any updating processes (such as a writing process) of the frozen file. When step 9010 is completed, said file becomes a clone source file 6011.

Next, the file cloning program 3005 creates a clone child differential file 6012 and a clone parent differential file 6010 (step 9006). Then, the file cloning program 3005 sets an inode number of the clone source file 6011 to a source pointer 3020 of an inode 3009 of the clone child differential file 6012 (step 9007).

According to this process, the inode 3009 of the clone child differential file 6012 and the inode 3009 of the clone source file 6011 are mapped. Further, the file cloning program 3005 sets a CLONE flag to the flag 3010 of the clone child differential file 6012.

As described, the file can be frozen by setting a GI flag to the flag 3010 of the file becoming the clone source file 6011. The file system program 3004 recognizes by confirming the GI flag that the relevant file is a clone source file 6011 and that update thereof is prohibited.

Further in step 9007, the file cloning program 3005 sets a CLONE flag to the flag 3010 of the clone parent differential file 6010. Then, the file cloning program 3005 sets an inode number of the clone source file 6011 to a source pointer 3020 of an inode 3009 of the clone parent differential file 6010.

Then, the file cloning program 3005 sets an inode number of the clone parent differential file 6010 to a parent differential pointer 3021 of the inode 3009 of the clone source file 6011. Similarly, the file cloning program 3005 increments a reference counter 3013 of the clone source file 6011.

Lastly, the file cloning program 3005 notifies the result of creation of a clone file to the management program 5002 via the management interface 5003 (step 9008). As a result, the relationship of data of clone files as described with reference to FIG. 6 is constructed. Further, when creating clone files, it is possible to enter the number of simultaneously created clone files to the file cloning program 3005. In that case, the file cloning program 3005 executes step 9006 for a designated number of times.

In the VDI environment assumed in the present embodiment, at first, a virtual disk file is created as the clone source file 6011, and the OS image of a VM is installed to the created virtual disk file. Thereafter, a clone child file 6003 is created with respect to the virtual disk file.

In the VDI environment (In case of using VDI technology), clone child files 6003 are created respectively for every end user using the client 1001. That is, if there are 1000 users, 1000 clone child files 6003 of virtual disk files are created. The end user starts the VM using the clone child file 6003 of the virtual disk file as the source.

On the other hand, after the VM is created, the clone source file 6011 will not be updated since the VM will not be started using the clone source file 6011 as the source. Therefore, in consideration of the VDI environment, it is also possible to adopt a method in which the file cloning program 3005 does not create a clone parent differential file 6010 in step 9006 of FIG. 9.

In other words, the performance of creating clone files can be enhanced since the file cloning program 3005 is not required to create clone parent differential files 6010. If clone parent differential files 6010 are not created, the updating of clone source files 6011 will be prohibited after creating clone files.

On the other hand, it is possible for the file cloning program 3005 to create the clone parent differential file 6010 when data is written to a clone parent file 6004 as described with reference to FIGS. 12 and 13 without creating the clone parent differential file 6010 in step 9006. According to this method, the clone parent differential file 6010 is not created when the clone child file 6003 is created, so that the performance of creating clone files is expected to be enhanced. Further, it is possible to write in data to the clone source file 6011.

According to the prior art, a clone file is created with respect to a retrieved snapshot. A snapshot is a file system image taken at a certain point of time. Therefore, the file system program must save the management information of the file system when acquiring a snapshot. As a result, it takes time to create clone files. However, since there is no need to acquire snapshots when creating clone files according to the present invention, the performance of creating clone files is expected to be enhanced.

Similarly, in the prior art example, upon executing a process corresponding to the creation of a clone child differential file 6012, a whole table corresponding to the data management table 3011 of the clone child differential file 6012 is created and the whole table is initialized. Therefore, since the virtual disk files assigned to the VM in the VDI environment may be created in sizes of tens of gigabytes, the initializing process takes a long time and the cloning process is delayed. According to the present invention, there is no need to initialize the data management table 3011, so that the clone file creation process can be performed at high speed without consuming excessive disk capacities.

Figure 10:
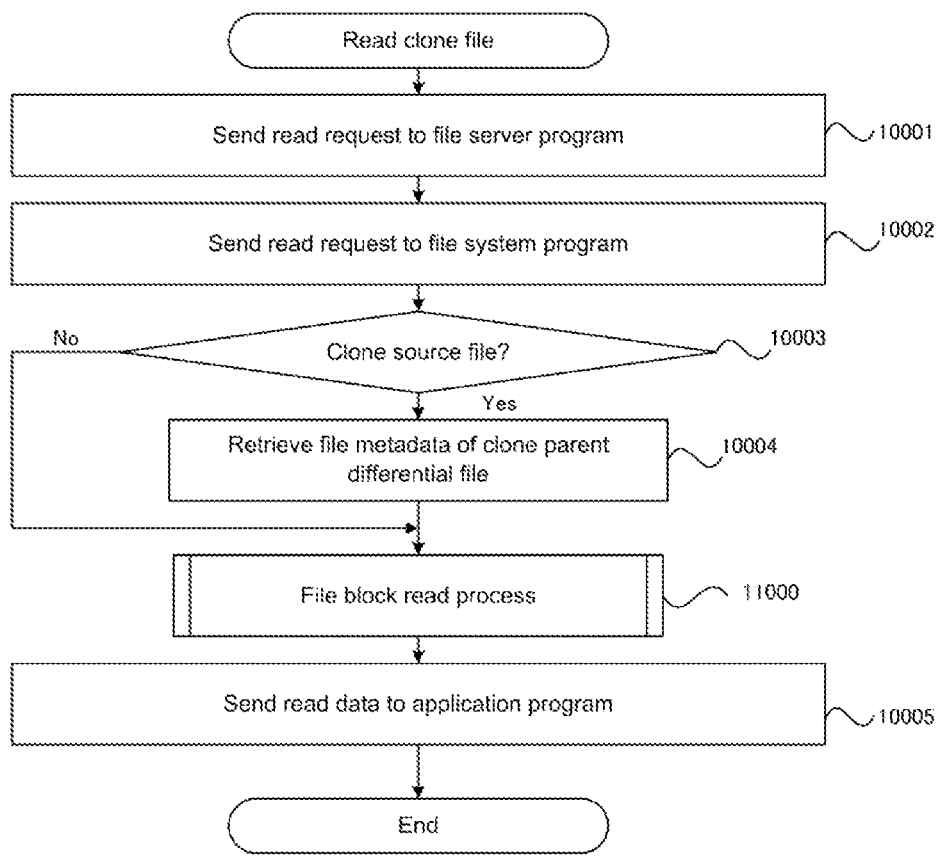
FIG. 10 is a flowchart showing an example of operation for reading clone files.

FIG. 10 is a flowchart illustrating the reading operation of clone files. When reading a clone child file 6003 or a clone parent file 6004, the application program 2003 of the client 1001 sends a request to read a file to the file access program 2004. Then, the file access program 2004 sends a file read request to a file server program 3003 of the file server 1003 (step 10001).

After the file server program 3003 receives the file read access request, the file server program 3003 sends a file read access request to the file system program 3004 (step 10002). The file system program 3004 having received the file read access request determines via flag 3010 whether the read target file is a clone source file 6011 or not (step 10003).

If the read target file is a clone source file 6011 (step 10003: Yes), the file system program 3004 retrieves the file metadata 3008 of the clone parent differential file 6010 using the inode number of the clone parent differential file 6010 stored in the differential pointer 3021 of the inode 3009 of the clone source file 6011 (step 10004).

The file block reading process of subsequent step 11000 is executed according to the status of the file metadata 3008 of the clone parent differential file 6010. The process of step 11000 is common for both the clone child differential file 6012 and the clone parent differential file 6010. On the other hand, if the read target file is not a clone source file 6011 (step 10003: No), the file system program 3004 executes step 11000. In the process of step 11000, the file system program 3004 actually reads the file blocks. The present process will be described in further detail later.

Finally, the file system program 3004 returns the result of reading the file to the file server program 3003, and the file server program 3003 sends the result to the file access program 2004. Then, the file access program 2004 notifies the result to the application program 2003 (step 10005). The file reading process requested by the application program 2003 is executed via the above described processes.

FIG. 11 is a flowchart showing the operation for reading a file according to the file system program 3004. The file system program 3004 confirms whether a GI flag or a CLONE flag is set to the flag 3010 of the file metadata 3008 of the clone parent differential file 6010 retrieved in step 10004 of FIG. 10 or the flag 3010 of the file metadata 3008 of the clone child differential file 6012 (Step 11002, step 11003).

If the flag is not set (step 11003: No), the file is processed as a regular file since the file is unrelated to the file cloning function (step 11004). On the other hand, if any of the flags is set (step 11003: Yes), the file system program 3004 processes the file as a clone file.

Now, the operation will be described based on the clone child differential file. The clone parent differential file will be processed in a similar manner. The file system program 3004 determines whether the data of the clone child differential file 6012 exists in the read file position (step 11005, step 11006). The management information described with reference to FIG. 7 will be used.

For example, if the client 1001 requests to read 10 bytes of data starting from 4 KB, the file system program 3004 determines that data exists since the file 7001 has disk blocks.

On the other hand, if the client 1001 requests to read 4 kilobytes of data starting from 20 KB, the file has no disk blocks since there is a hole 7022 in that section of the file 7001. Therefore, the file system program 3004 determines that there is "no data".

If the file system program 3004 determines that data exists in step 11006, the file system program 3004 reads the data from the clone child differential file 6012 and sends this data to complete the process of FIG. 11.

On the other hand, if the file system program 3004 determines that there is no data in step 11006, the file system program 3004 compares the minimum size 3012 and the read position (step 11012). If the read position is behind the rearmost position of data of the minimum size 3012 (step 11012: Yes), the file system program 3004 returns "0" (step 11010).

This process is effective when the size of the clone child differential file 6012 having been cut down (after deleting a data) via the clone source file 6011 is elongated by the client 1001. When this process is performed, the data of the clone child differential file 6012 corresponding to the sections where data has been cut down becomes holes. When the client 1001 requests to read the section corresponding to the holes, the file system program 3004 must return "0".

However, the file system program 3004 cannot judge based merely on holes whether the clone child differential file 6012 has no data (the clone child file 6003 is not updated) or has been cut down. Therefore, the minimum size at which the minimum size 3012 has been cut down is stored. The file system program 3004 can determine whether to return "0" or to return the data of the clone source file 6011 by comparing the rearmost position of data of the minimum size 3012 and the read position.

On the other hand, if the determination result in step 11012 is "no", the file system program 3004 checks whether the clone source file 6011 has data blocks based on the data management table 3011 of the clone source file 6011 (step 11008, step 11009). If the clone source file 6011 has no data blocks (step 11009: No), the procedure advances to step 11010 where the file system program 3004 returns "0" and ends the process.

On the other hand, if the determination result in step 11009 is "yes", the file system program 3004 returns the data of the clone source file 6011 and ends the process. According to this process, the client 1001 can read the clone child file 6003 or the clone parent file 6004.

Based on step 11012 of the file read operation subroutine 11000, data can be read correctly even if the size of the clone child file differs from the size of the clone source file. If the file system program 3004 does not perform step 11012, it is not possible to determine whether there was no data from the beginning or that the data of the clone child differential file 6012 has been changed to "0" by having the disk blocks deleted.

Figure 12:
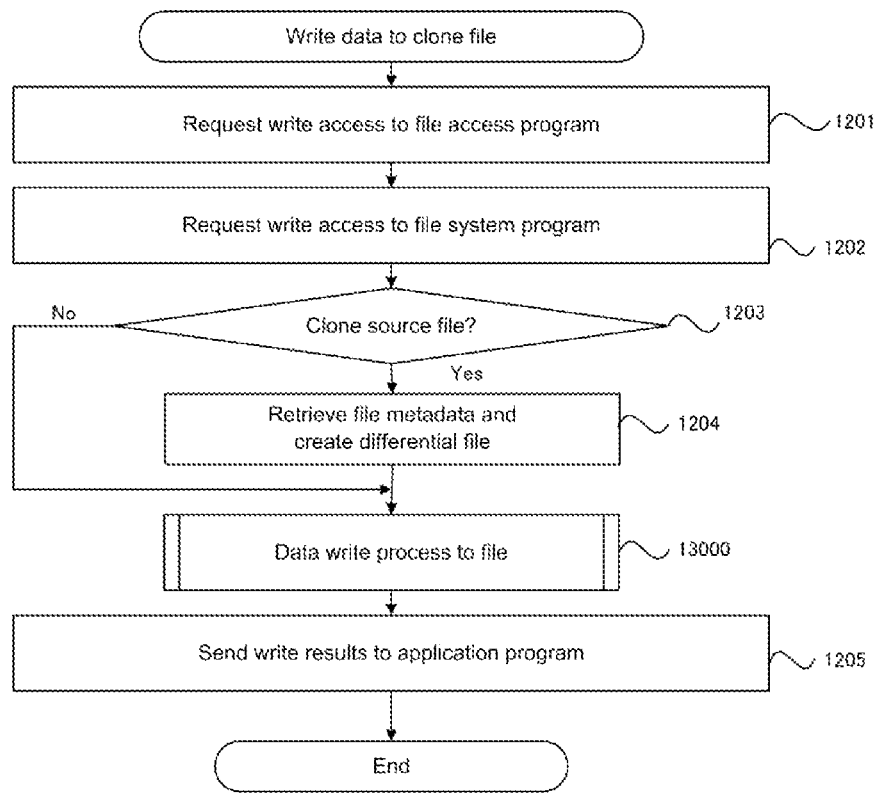
FIG. 12 is a flowchart showing an example of operation for writing data to clone files.

FIG. 12 is a flowchart showing the operation of writing data to a clone file. When the application program 2003 of the client 1001 writes data to the clone child file 6003 or the clone parent file 6004, a request to write data to a file is sent to the file access program 2004. The file access program 2004 sends the file write access request to the file server program 3003 of the file server 1003 (step 1201).

After receiving the file write access request, the file server program 3003 requests the file system program 3004 to perform the file writing process (step 1202).

The file system program 3004 having received the file write access request determines based on flag 3010 whether the data write target file is a clone source file 6011 or not (step 1203). If the data write target file is a clone source file 6011 (step 1203: Yes), the file system program 3004 retrieves the file metadata 3008 of the clone parent differential file 6010 based on the inode number of the clone parent differential file 6010 stored in the parent differential pointer 3021 of the inode 3009 of the clone source file 6011 (step 1204).

If a clone parent differential file 6010 is created when write access occurs to the clone parent file 6004, the execution of step 9006 is requested to the file cloning program 3005 when the file system program 3004 executes step 1204.

In the following step 13000, the operation is performed based on the file metadata 3008 of the clone parent differential file 6010. The process of step 13000 is common for both the clone child differential file 6012 and the clone parent differential file 6010. On the other hand, if step 1203 is "No", the file system program 3004 will not perform any process and the procedure advances to the subsequent step 13000. The file system program 3004 actually writes data into the file blocks in step 13000. The present process will be described in detail later.

Finally, the file system program 3004 returns the file write results to the file server program 3003, and the file server program 3003 sends the results to the file access program 2004. Thereafter, the file access program 2004 sends the results to the application program 2003 (step 1205). The file writing process requested via the application program 2003 is performed by the above process.

Figure 13:
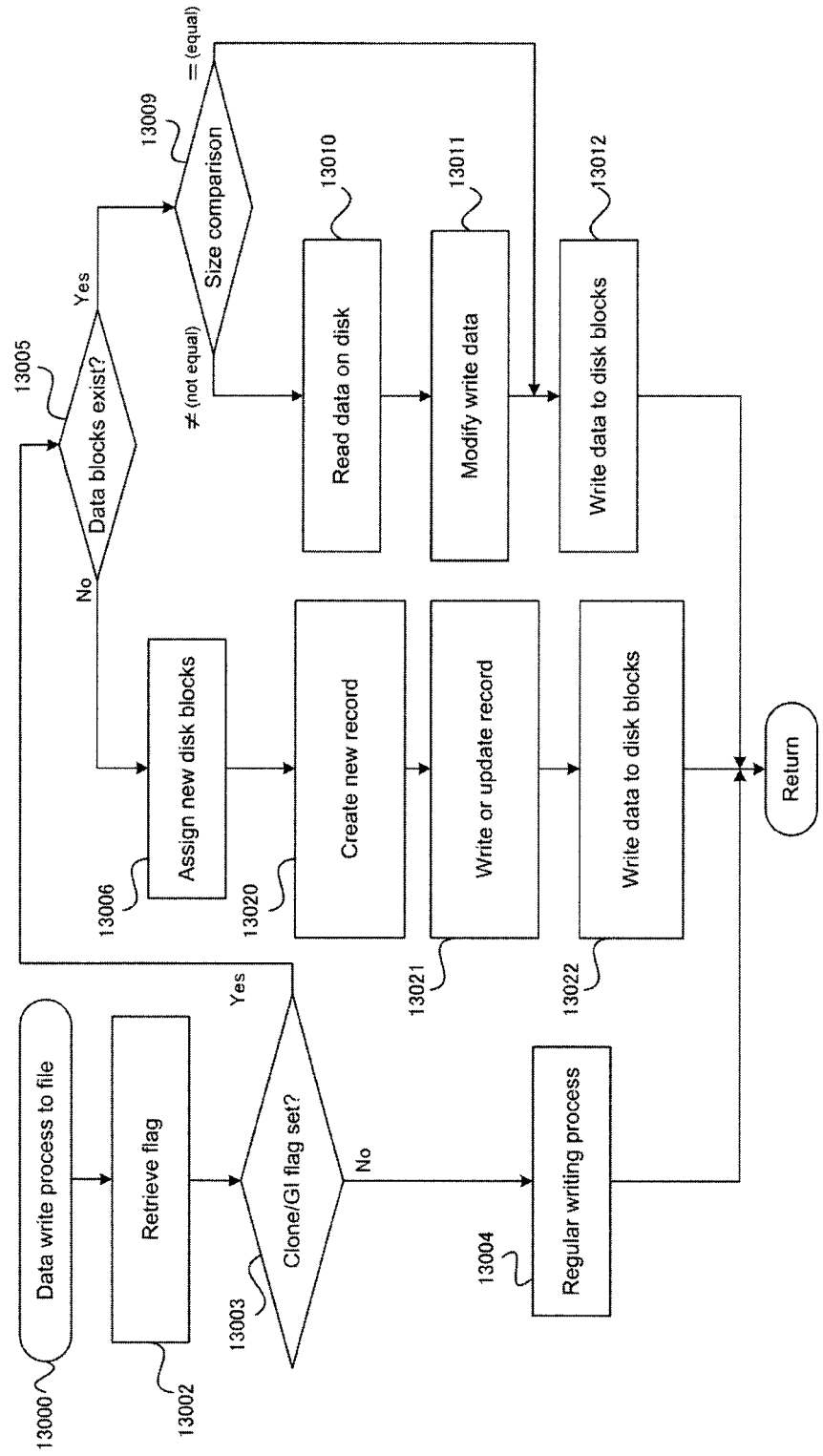
FIG. 13 is a flowchart showing an example of operation for writing data to files via the file system program.

FIG. 13 is a flowchart showing the data writing operation to a file according to the file system program 3004. The file system program 3004 checks whether a GI flag or a CLONE flag is set to the flag 3010 of the file metadata 3008 of the clone parent differential file 6010 computed in step 1204 of FIG. 12 or the flag 3010 of the file metadata of the clone child differential file 6012 (step 13002, step 13003).

If the flag is not set, the file is processed as a regular file since the file is unrelated to the file cloning function (step 13004). On the other hand, if any of the flags is set (step 13003: Yes), the file system program 3004 processes the file as a clone file. Now, the operation will be described based on the clone child differential file. The clone parent differential file will be processed in a similar manner.

The file system program 3004 determines whether the data of the clone child differential file 6012 exists in the write file position (step 13005). The management information described in FIG. 7 will be used for this step. For example, if the client 1001 requests to write 10 bytes of data starting from 4 KB, the file system program 3004 determines that "data exists" since the file 7001 has data blocks.

On the other hand, if the client 1001 requests to write 4 kilobytes of data starting from 20 KB, the file has no disk blocks since there is a hole 7022 in that section of the file 7001. Therefore, the file system program 3004 determines that there is "no data". If the file system program 3004 determines that there is no data in step 13005, the file system program 3004 assigns a new disk block to the clone child differential file 6012 (step 13006).

As described in FIG. 7, if the assigned block is not started from a block next to an already assigned block, the file system program 3004 creates a new record to the data management table 3011 (step 13020).

Next, the file system program 3004 either writes a new record created in step 13020 to the disk or updates an already existing record (step 13021).

According to the process of steps 13006, 13020 and 13021, the records of the data management table 3011 are added when data is written to the clone child differential file 6012. Therefore, during creation of the clone child differential file 6012, there is no need to create a record of the data management table 3011. As a result, the clone child differential file 6012 can be created speedily.

The file system program 3004 writes the data to the memory if the clone source file 6011 has data, and the data is rewritten by the write data before the data is written to assigned disk blocks (step 13022). If there is no data in the clone source file 6011, the write data is written without alteration to the assigned blocks.

On the other hand, in step 13005, if the file system program 3004 determines that data exists (proceed to Yes), the file system program 3004 determines whether the write size is equal to the block size of block 7010 (4 KB according to FIG. 7) (step 13009).

If the write size is equal to the size of the block 7010 (step 13009: "="), the file system program 3004 writes the write data without any alteration to the disk blocks. On the other hand, when the size is not equal in step 13009, the file system program 3004 temporarily reads the data on the disk 4005 of the clone source file 6011 to the memory 3002 (step 13010).

The file system program 3004 writes data to the data write position of the data having been read to the memory 3002 (step 13011). Then, the file system program 3004 writes the data in the memory 3002 to the disk 4005 (step 13012).

In order to process the reading and writing operations per disk block, if the write size is smaller than the block size, the file system program 3004 must first read the data in the disk to the memory and modify the data before writing data in the block. However, if the write size is equal to the disk block size, there is no need to read data to the memory.

On the other hand, if the file system program 3004 determines that there is no data in step 13005 (proceed to "No"), a new disk block is assigned to the clone child differential file 6012 (step 13006). Then, the file system program 3004 writes data into the assigned disk blocks and ends the process (step 13012). According to the above process, the client 1001 can write data into the clone child file 6003 or the clone parent file 6004.

Figure 14:
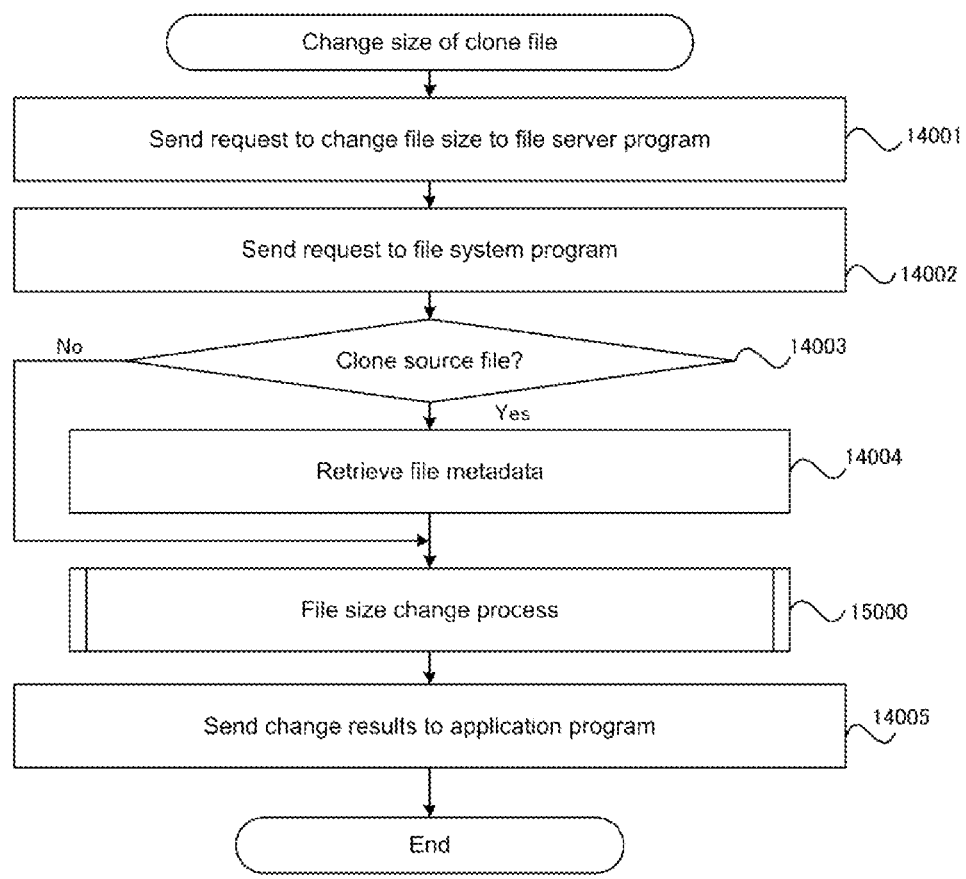
FIG. 14 is a flowchart showing an example of operation for changing the size of clone files.

FIG. 14 is a flowchart showing the operation for changing the size of clone files. When the application program 2003 of the client 1001 wishes to change the size of the clone child file 6003 or the clone parent file 6004, the application program sends a file size change request to the file access program 2004. The file access program 2004 sends the file size change request to the file server program 3003 of the file server 1003 (step 14001).

After receiving a file size change request, the file server program 3003 sends the file size change request to the file system program 3004 (step 14002). The file system program 3004 having received the file size change request determines whether the target file of the file size change request is a clone source file 6011 or not based on the flag 3010 (step 14003).

If the target file of the file size change request is a clone source file 6011 (step 14003: "Yes"), step 14004 is executed. In step 14004, the file system program 3004 retrieves the file metadata 3008 of the clone parent differential file 6010 based on the inode number of the clone parent differential file 6010 stored in the parent differential pointer 3021 of the inode 3009 of the clone source file 6011.

In the next step 15000, the file size change process is performed based on the file metadata 3008 of the clone parent differential file 6010. Further, the contents of the process of step 15000 are common for both the clone child differential file 6012 and the clone parent differential file 6010. On the other hand, if the determination result of step 14003 is "No", the procedure advances to step 15000 without any operation performed by the file system program 3004. In step 15000, the file system program 3004 actually changes the file size. The present process will be described in detail later.

Thereafter, the file system program 3004 notifies the results of change of file size to the file server program 3003. The file server program 3003 sends the results of file size change to the file access program 2004. The file access program 2004 notifies the result of file size change to the application program 2003 (step 14005). By the above-described process, the file size change process requested via the application program 2003 can be performed.

Figure 15:
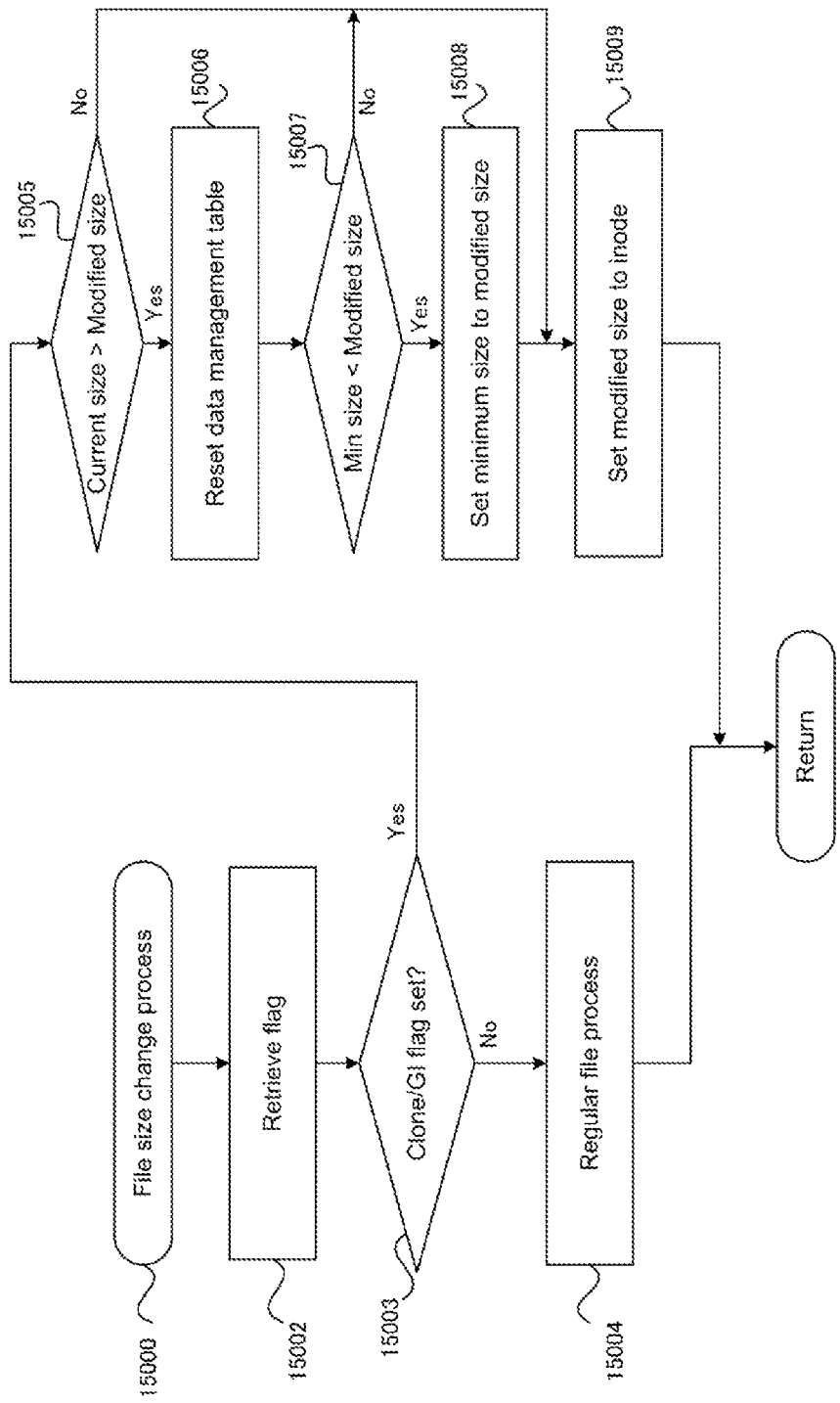
FIG. 15 is a flowchart showing an example of operation for changing the size of clone files via the file system program.

FIG. 15 is a flowchart showing the file size change operation of the file system program 3004. The file system program 3004 checks whether a GI flag or a CLONE flag is set to the flag 3010 of the file metadata 3008 of the clone parent differential file 6010 or the flag 3010 of the file metadata 3008 of the clone child differential file 6012 retrieved in step 14004 of FIG. 14 (Step 15002, step 15003).

If the flag is not set (step 15003: "No"), the file is processed as a regular file since the file is unrelated to the file cloning function (step 15004). On the other hand, if any of the flags is set (step 15003: "Yes"), the file system program 3004 processes the file as a clone file. Now, the present operation will be described as a process for processing the clone child differential file. The clone parent differential file will be processed in a similar manner.

The file system program 3004 compares the current file size and the modified file size (step 15005). As a result, if the modified file size is greater (step 15005: "No"), the file system program 3004 sets the modified file size to the inode 3009 of the clone child differential file 6012 (step 15009) and ends the process.

On the other hand, if the modified file size is smaller (step 15005: Yes), the file system program 3004 discards the cut down (after deleting a data) data blocks which are no longer necessary. In other words, the file system program 3004 resets the data management table 3011 of the clone child differential file 6012 (step 15006).

Thereafter, the minimum size 3012 of the clone child differential file 6012 and the modified file size are compared. If the modified file size is smaller (step 15007: Yes), the modified file size is set as the minimum size 3012 of the clone child differential file 6012 (step 15008). The file system program 3004 sets the modified file size to the inode 3009 of the clone child differential file 6012 and ends the process (step 15009).

On the other hand, if the determined result of step 15007 is "No" (the modified file size is greater), the file system program 3004 sets the modified file size to the inode 3009 of the clone child differential file 6012 and ends the process (step 15009). By the above process, the client 1001 can change the file size of the clone child file 6003 or the clone parent file 6004.

Figure 16:
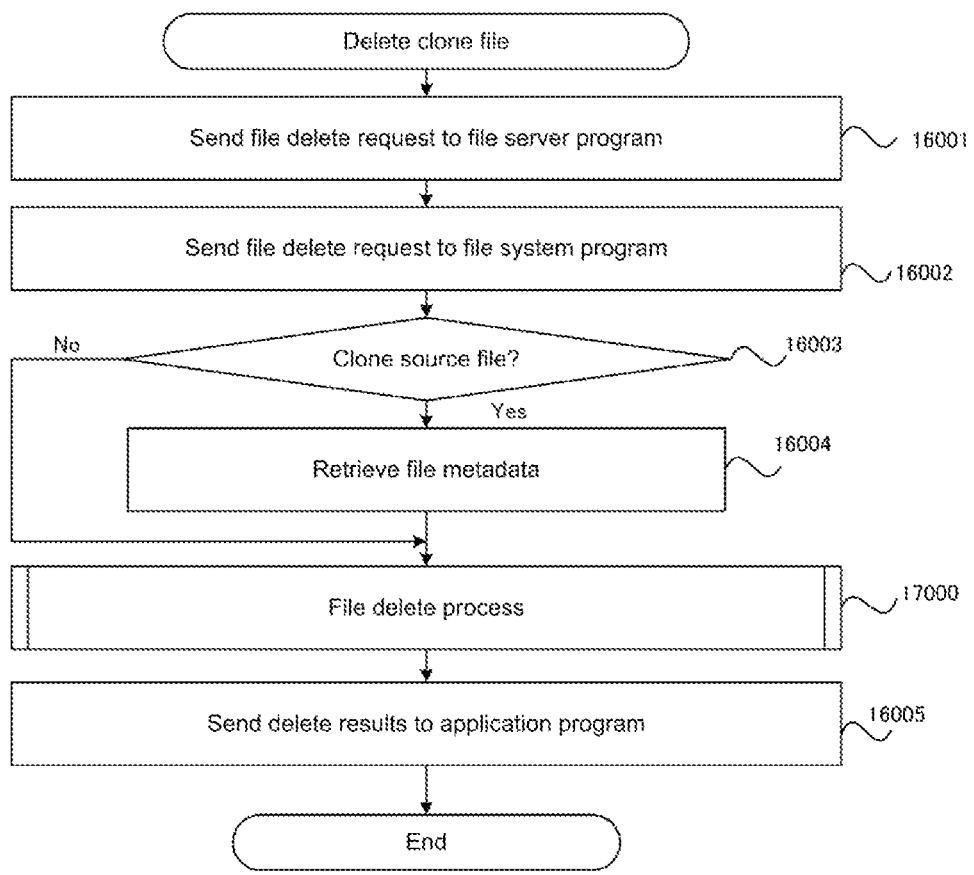
FIG. 16 is a flowchart showing an example of operation for deleting clone files.

FIG. 16 is a flowchart showing the operation for deleting clone files. When the application program 2003 of the client 1001 wishes to delete the clone child file 6003 or the clone parent file 6004, it sends a file delete request to the file access program 2004. The file access program 2004 sends the file delete request to the file server program 3003 of the file server 1003 (step 16001). After having received the file delete request, the file server program 3003 sends the file delete request to the file system program 3004 (step 16002).

The file system program 3004 having received the file delete request determines whether the file is a clone source file 6011 or not based on the flag 3010 (step 16003). If the file is a clone source file 6011 (step 16003: "Yes"), step 16004 is executed. In step 16004, the file system program 3004 retrieves the file metadata 3008 of the clone parent differential file 6010 via the inode number of the clone parent differential file 6010 stored in the parent differential pointer 3021 of the inode 3009 of the clone source file 6011.

In the following step 17000, the file delete operation is executed based on the file metadata 3008 of the clone parent differential file 6010. Further, the contents of the file delete operation of step 17000 are common for both the clone child differential file 6012 and the clone parent differential file 6010.

On the other hand, if the determined result of step 16003 is "No", the procedure advances to the next step without the file system program 3004 performing any operation. In step 17000, the file system program 3004 actually deletes the file. The present process will be described in detail later.

Finally, the file system program 3004 returns a file delete result to the file server program 3003, and the file server program 3003 sends the result to the file access program 2004.

Then, the file access program 2004 notifies the delete result to the application program 2003 (step 16005). Based on the above process, the file delete process requested via the application program 2003 is performed.

Figure 17:
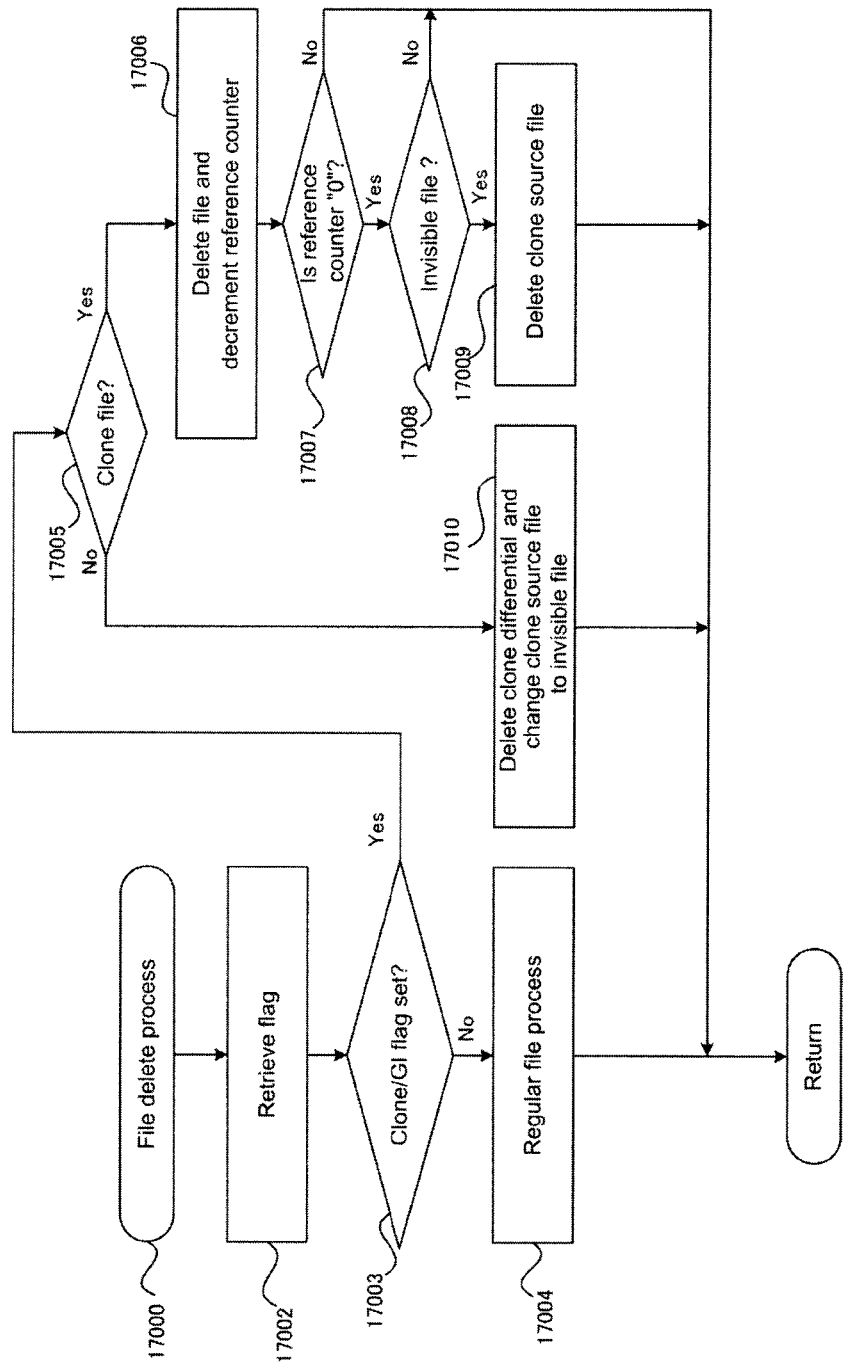
FIG. 17 is a flowchart showing an example of operation for deleting clone files via the file system program.

FIG. 17 is a flowchart showing the clone file delete operation of the file system program 3004. The file system program 3004 checks whether a GI flag or a CLONE flag is set to the flag 3010 of the file metadata 3008 of the clone parent differential file 6010 or the flag 3010 of the file metadata 3008 of the clone child differential file 6012 retrieved in step 14004 of FIG. 16 (step 17002, step 17003).

If the flag is not set, the file is processed as a regular file since the file is unrelated to the file cloning function (step 17004). On the other hand, if any of the flags is set (step 17003: "Yes"), the file system program 3004 processes the file as a clone file. Now, the present operation will be described as a process for deleting the clone child differential file. The clone parent differential file will be processed in a similar manner.

The file system program 3004 determines whether the file is a clone child differential file or a clone source file based on the flag set to the flag 3010. If a GI flag is set to the flag 3010 (step 17005: "No"), the file system program 3004 deletes the clone parent differential file 6010 and changes the name of the clone source file 6011 to an invisible file name (step 17010).

In order to change the file to an invisible file, for example, the file system program 3004 changes the start data of the file name of the clone source file 6011 to "." or NULL (blank). By this change, it seems to the client as if the file has been deleted. However, since the clone child file 6003 uses the clone source file 6011, the clone source file 6011 cannot be deleted. This problem can be solved by using invisible files.

On the other hand, if a CLONE flag is set to the flag 3010 (step 17005: "Yes"), the file system program 3004 deletes the clone child differential file 6012. Then, the file system program 3004 decrements the reference count 3013 of the clone source file 6011 (step 17006).

The file system program 3004 determines whether the reference counter 3013 is "0". If the reference counter 3013 is not "0" (step 17007: "No"), the file system program 3004 ends the delete process. On the other hand, if the reference counter 3013 is "0" (step 17007: "Yes"), the file system program 3004 checks whether the clone source file 6011 is an invisible file or not (step 17008).

If the clone source file 6011 is not an invisible file (step 17008: "No"), the file system program 3004 ends the delete process. On the other hand, if the clone source file 6011 is an invisible file (step 17008: "Yes"), the file system program 3004 deletes the clone source file 6011 (step 17009) and ends the file delete process.

As described, by utilizing the reference counter 3013 and the invisible file, the file system program 3004 can delete the clone child file 6003 or the clone parent file 6004 while maintaining the relationship between files of clone files shown in FIG. 6.

Figure 18:
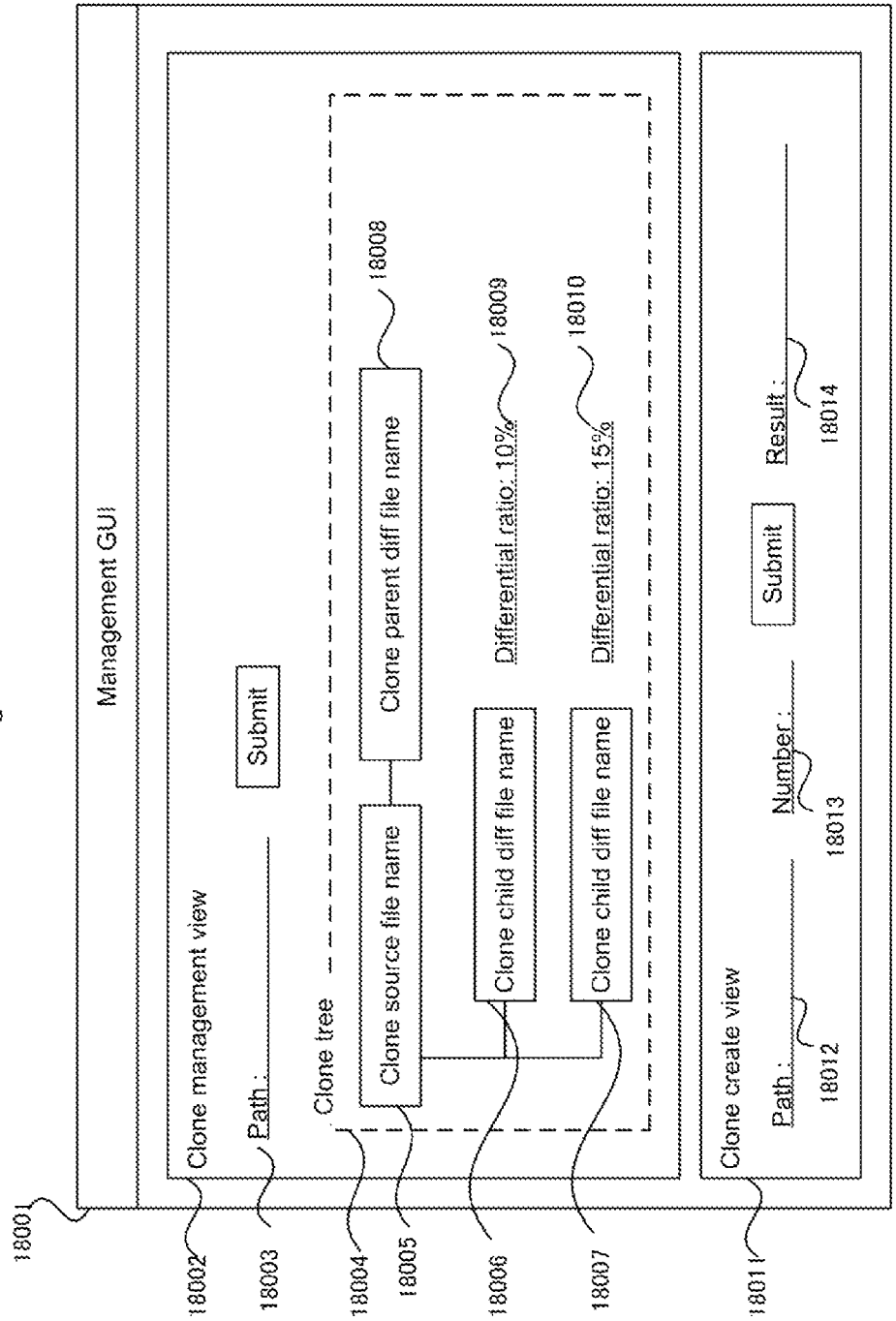
FIG. 18 is a view showing an example of a management GUI.

FIG. 18 is an example of a management GUI (Graphic User Interface) 18001 that the management program 5002 of the management terminal 1005 provides to administrators and end users. The management GUI 18001 has a clone management view 18002 and a clone create view 18011.

The clone management view 18002 has an entry box 18003 for entering the path of a clone file that the administrator or the end user wishes to display, and a submit button for submitting the entered information. When the administrator or the end user enters a path of a clone file to the entry box 18003 and presses the submit button, the clone relationship of the file is displayed on a clone tree 18004. The file relationship of a clone file as described in FIG. 7 is displayed on the clone tree 18004.

In the clone tree, a box 18005 showing the file name of the clone source file 6011, a box 18008 showing the file name of the clone parent differential file, and boxes 18006 and 18007 showing the file name of the clone child differential file are displayed. Further, fields 18009 and 18010 are displayed on the right side of the boxes 18006 and 18007 showing differentiation ratios for indicating the ratio of differences written in the clone child differential file 6012. FIG. 18 illustrates an example in which two clone child files 6012 are created, but the number of files can be one, or more than three.

When the administrator or the end user creates clones, the administrator or the end user enters the path of the file to be set as the clone source file 6011 and the number of files to be created to the entry boxes 18012 and 18013 of the clone create view 18011. Thereafter, when the administrator or the end user presses the submit button, the creation of a clone file is executed. Finally, the executed results are displayed on the box 18014.

According to the first embodiment described above, only the file metadata 3008 should be created when the file system program creates the clone file. Accordingly, the clone file can be created speedily since there is no need to create and initialize the data management table for managing the disk blocks.

Embodiment 2

According to the second embodiment, the clone child file 6003 is created as a clone source file 6011. In other words, the present embodiment illustrates a case in which the clone child file 6003 is created as a nesting structure. According to the present embodiment, the clone child file can be crated freely at arbitrary timings.

Figure 19:
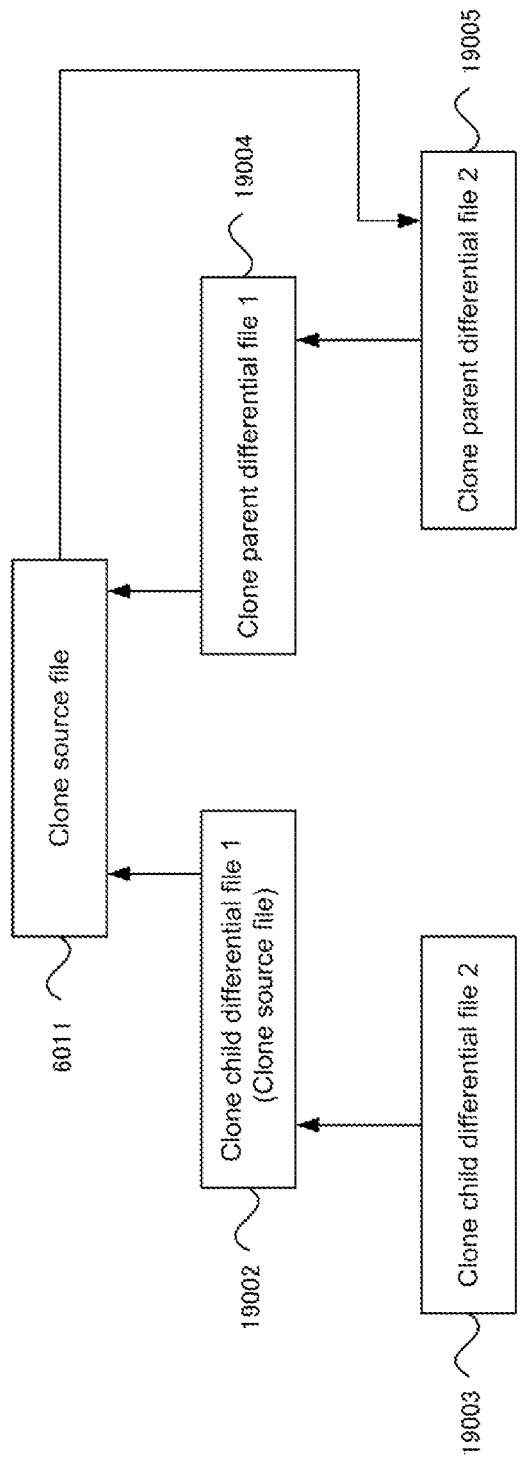
FIG. 19 is a view showing a hierarchical structure of clone files according to embodiment 2 of the present invention.

FIG. 19 illustrates one example of the hierarchical structure of a clone file. The clone source file 6011 of FIG. 19 is equivalent to the clone source file of FIG. 6. The clone child differential file 1 19002 designates the clone source file 6011. As mentioned earlier, the update data for the clone child file after the clone child differential file 1 19002 has been created is stored in the clone child differential file 1 19002.

On the other hand, the update data for the clone parent file is stored in the clone parent differential file 1 19004. The clone source file 6011 according to the present embodiment stores the last information designating the clone parent differential file in the file metadata. For example, the end user creates a clone child file for the clone child file at this time. In that case, the clone child differential file 1 19002 becomes the clone source file. Then, simultaneously as when the clone child differential file 2 19003 is created, the clone parent differential file 2 19005 is created.

When a data write operation to the clone child file occurs after the clone of a clone child file has been created, differential data is stored in the clone child differential file 2 19003. On the other hand, when a data write operation occurs to the clone parent file, differential data is stored in the clone parent differential file 2 19005. The clone source file 6011 can designate the relationship with the clone parent differential file 2 19005 which is the last clone parent differential file based on the source pointer 3020 and the parent differential pointer 3021 stored in the inode 3009.

As described, if the clone child file adopts a hierarchical nesting structure, the clone parent file also adopts a nesting structure. According to this system, it becomes possible to retain the write differential data to the clone child file and the write differential data of the clone parent file.

In FIG. 19, only one clone child file regarding a clone child file is shown, but the clone child file can retain two or more clone child files. In other words, the clone child differential file 1 19002 can have a clone child differential file 3 in addition to the clone child differential file 2 19003. The present embodiment does not limit the number or the type of the clone child differential files.

Figure 20:
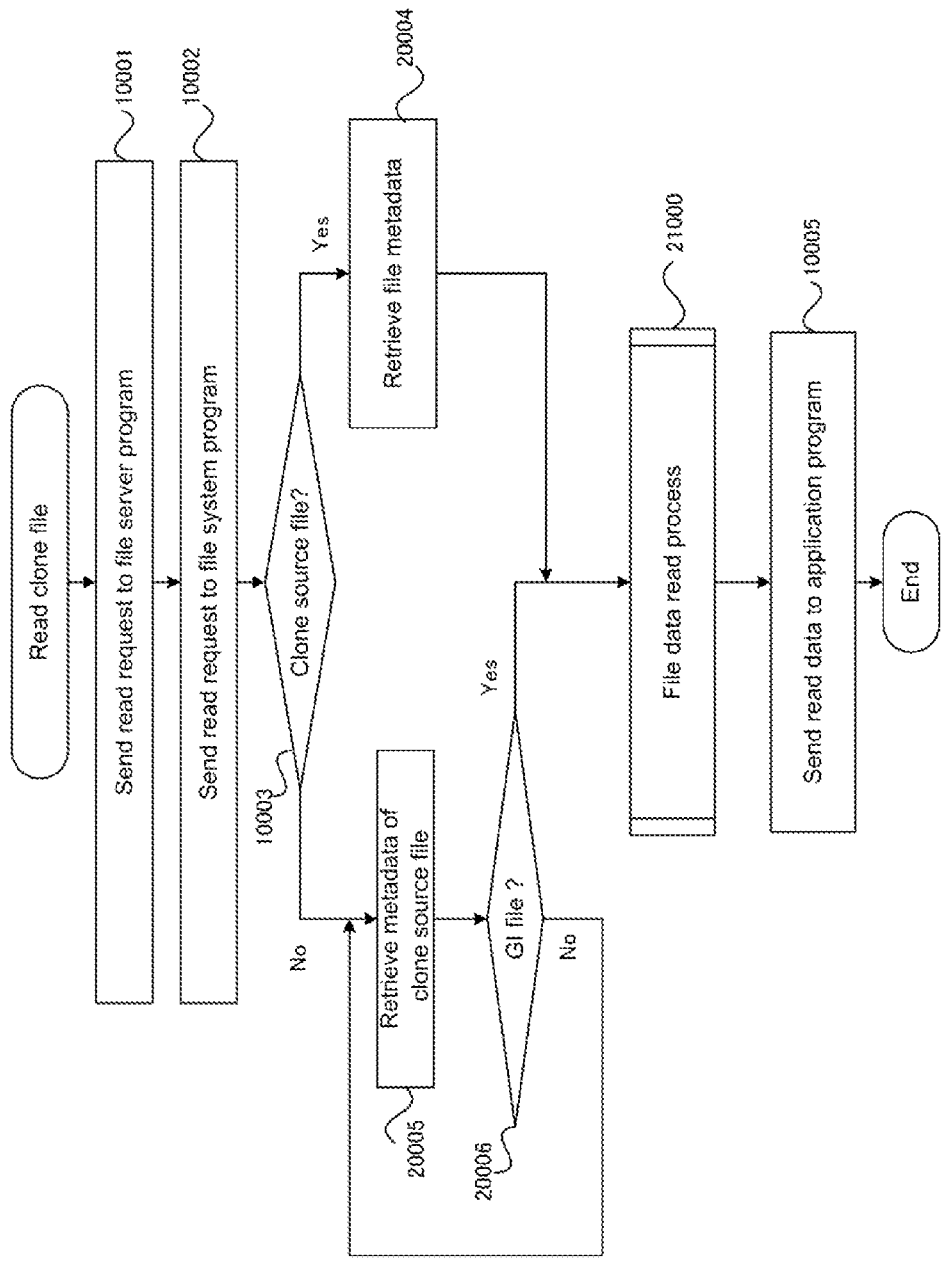
FIG. 20 is a flowchart showing an example of operation for reading clone files according to embodiment 2.

FIG. 20 is a flowchart showing the reading operation of a clone file according to the hierarchical structure of the clone file. The basic flow of reading operation of the clone file has been described with reference to FIG. 10. Now, the characteristic feature of the operation flow of the hierarchical structure of the clone file will be described.

The reading operation of the clone child file 6003 and the clone parent file 6004 by the application program 2003 is similar to FIG. 10 from process 10001 to process 10003. In process 10003, if the read target file is a clone source file (step 10003: Yes), the file system program 3004 retrieves the file metadata 3008 of the last clone parent differential file regarding the read target file.

On the other hand, the file system program 3004 executes process 21000 using the file metadata of the clone parent differential file and the file metadata of the clone source file being the target of the read operation. In other words, in the case of FIG. 19, the application program 2003 retrieves the file metadata 3008 of the clone parent differential file 2 19005 (last clone parent differential file) designated by the file metadata 3008 of the clone source file 6011 in order to read the clone parent file.

On the other hand, if the read target file is not a clone source file (step 10003: No), the file system program 3004 executes step 20005 and step 20006 to retrieve the file metadata of the original (GI) clone source file (hereinafter referred to as root clone source file).

If the file metadata of the root clone source file can be retrieved (step 20006: Yes), the file system program 3004 executes process 21000 of FIG. 21 using the file metadata of the read target file and the file metadata of the root clone source file.

In the case of FIG. 19, the file system program 3004 retrieves the file metadata of the clone child differential file 1 19002 regarding the information of the clone source file included in the clone child differential file 2 19003. Further, the file system program 3004 retrieves the file metadata of the clone source file 6011 from the file metadata of the clone child differential file 1 19002. Then, the file system program 3004 executes the process 21000 of FIG. 21 using the file metadata of the clone parent differential file of the target file to be read and the file metadata of the clone source file.

As described, according to the hierarchical structure of the clone file, the file system program 3004 executes the read process using the file metadata of the last clone parent differential file or the last clone child differential file. Therefore, the file system program 3004 must follow the clone child differential file adopting a nesting structure.

Figure 21:
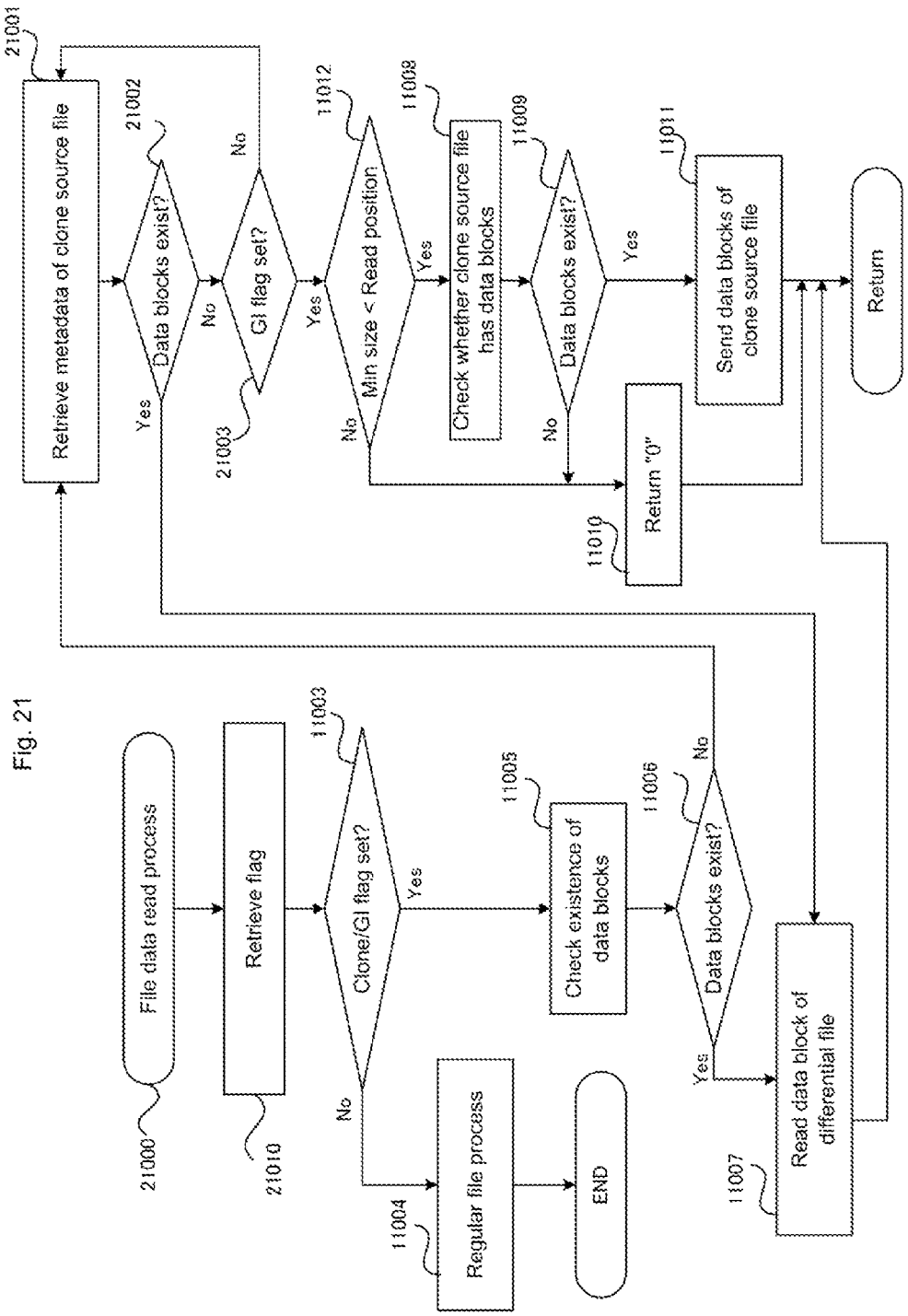
FIG. 21 is a flowchart showing an example of operation for reading clone files via the file system program according to embodiment 2.

FIG. 21 illustrates a flowchart of a read file process of clone files adopting a hierarchical structure. Regarding a clone file adopting a hierarchical structure, the file reading process follows the nesting structure. For example, in the example of FIG. 19, upon reading a clone child differential file 2 19003, the file system program 3004 checks whether the clone child differential file 2 19003 has an update differential data. When there is no update differential data, the file system program 3004 checks the update differential data of the clone child differential file 1 19002.

If there is no update differential data to the root clone source file, the file system program 3004 sends "0" to the application program. If there is an update differential data before reaching the root clone source file, the file system program 3004 sends the update differential data to the application program.

According to FIG. 21, in step 21010, the file system program 3004 checks the flag 3010 of the last clone parent differential file or the last clone child differential file. If the file is related to a clone file (step 11003: "Yes"), the file system program 3004 checks whether the file has data blocks or not (steps 11005 and 11006).

If the file has no data blocks (step 11006: "No"), the file system program 3004 retrieves the file metadata of the clone source file and checks whether the clone source file has data blocks or not (step 21001).

If the file has data blocks (step 21002: "Yes"), the file system program 3004 reads the data blocks and sends the same to the application program (step 11007). On the other hand, if the file has no data blocks (step 21002: "No"), the file system program 3004 determines whether the file is a root clone source file or not based on flag 3010 (step 21003).

If the file is a root clone source file, the file system program 3004 executes the processes of step 11012 and subsequent steps. On the other hand, if the file is not a root clone source file (step 21003: "No"), the file system program 3004 returns to step 21001 and continues the process in order to follow the nest structure.

As described, the file system program 3004 follows the hierarchical structure of the clone file, and if there are data blocks, the data is sent to the application program 2003, and if not, "0" is returned to the application program 2003.

Figure 22:
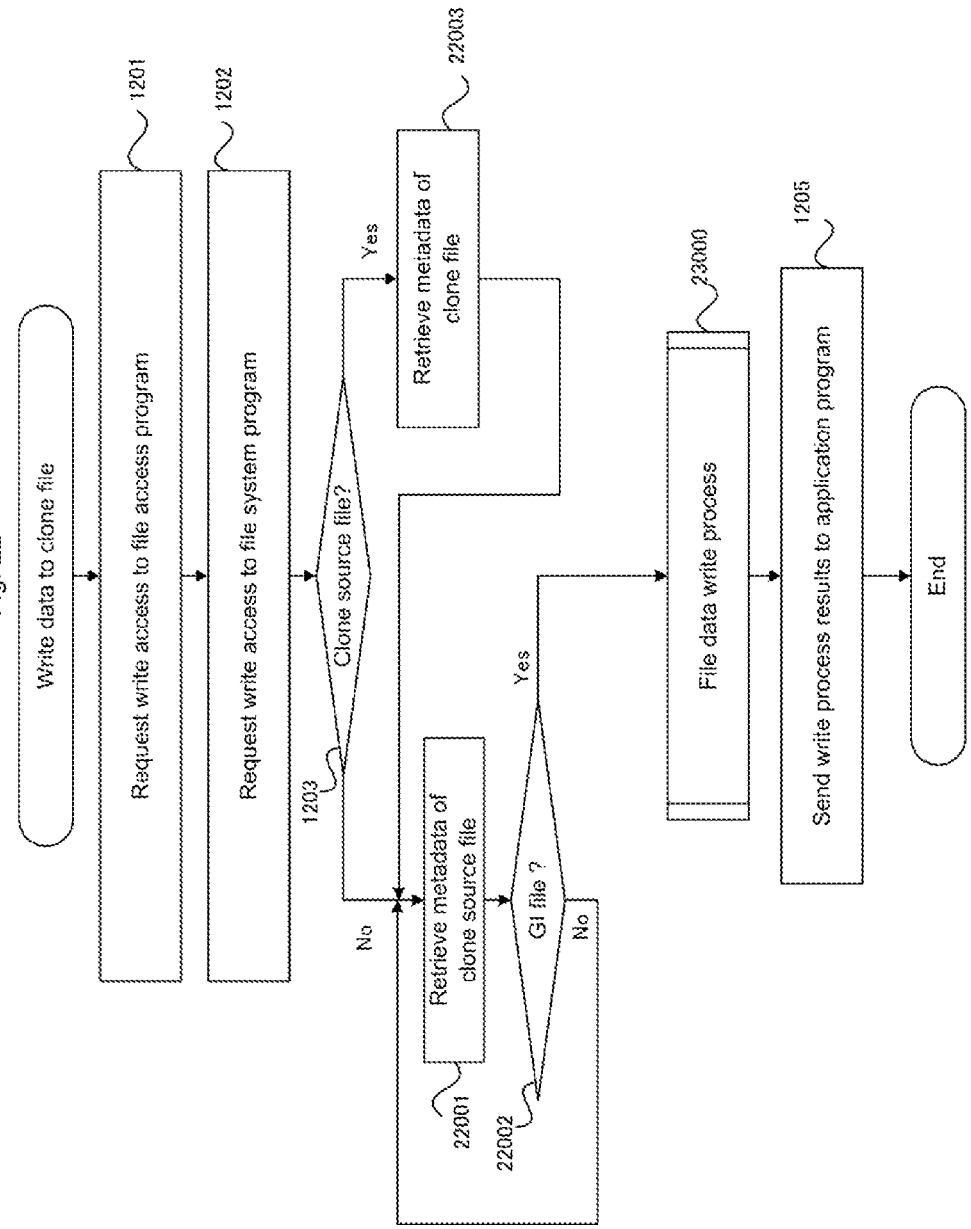
FIG. 22 is a flowchart showing an example of operation for writing data to clone files according to embodiment 2.

FIG. 22 is a flowchart showing the operation to write data to clone files according to the hierarchical structure of the clone files. The basic flow of writing data to clone files has been described with reference to FIG. 12. Here, the differences of the operation flow regarding the hierarchical structure of the clone files will be described.

When the application program 2003 writes data to the clone child file 6003 or the clone parent file 6004, the processes being performed are equivalent to FIG. 12 from step 1201 to step 1202. In step 1202, if the write target file is a clone source file (step 1203: "Yes"), the file system program 3004 retrieves the file metadata 3008 of the last clone parent differential file regarding the write target file.

The file system program 3004 executes process 23000 using the file metadata 3008 of the clone parent differential file and the file metadata 3008 of the clone source file being the write target. In the example of FIG. 19, the application program 2003 retrieves the file metadata 3008 of the clone parent differential file 2 19005 (last clone parent differential file) designated by the file metadata 3008 of the clone source file 6011.

On the other hand, if the write target file is not a clone source file (step 1203: "No"), the file system program 3004 executes steps 22001 and 22002 so as to retrieve the file metadata of the root clone source file.

If the file metadata of the root clone source file can be retrieved (step 22002: Yes), the file system program 3004 executes step 21000 using the file metadata of the read target file and the file metadata of the root clone source file.

In other words, according to the example of FIG. 19, the file system program 3004 retrieves the file metadata of the clone child differential file 1 19002 by following the information of the clone source file stored in the clone child differential file 2 19003. Further, the file system program 3004 retrieves the file metadata of the clone source file 6011 from the file metadata of the clone child differential file 1 19002. Then, the file system program 3004 executes step 23000 using the file metadata of the clone parent differential file and the file metadata of the clone source file being the write target.

As described, regarding the hierarchical structure of clone files, the file system program 3004 performs processes using the last clone parent differential file or the last clone child differential file. Therefore, the file system process 3004 must follow the clone child differential file adopting a nesting structure.

Figure 23:
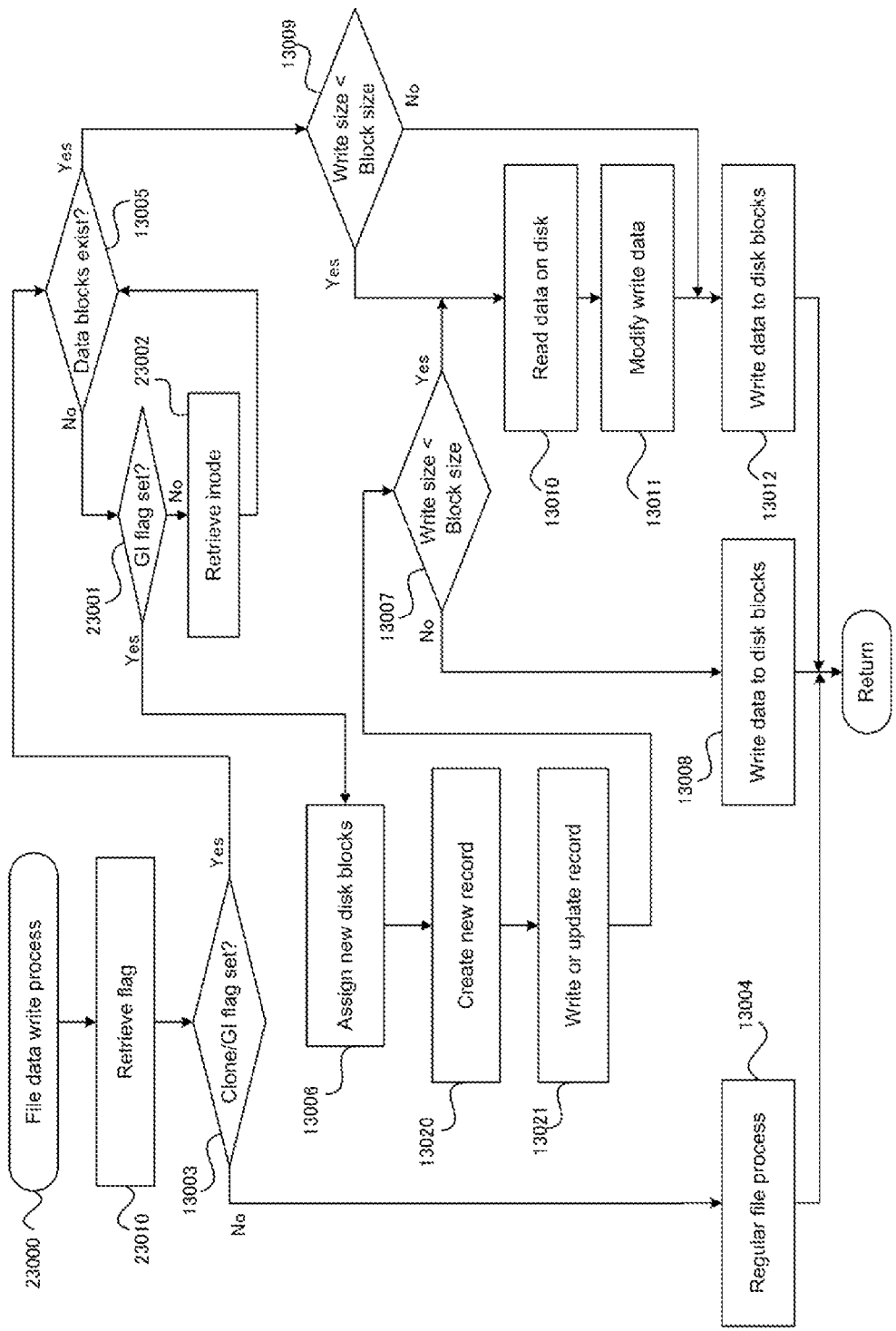
FIG. 23 is a flowchart showing an example of operation for writing data to clone files via the file system program according to embodiment 2.

FIG. 23 shows a flowchart of the process of writing data to files of clone files adopting a hierarchical structure. The nesting structure is followed in the clone files adopting a hierarchical structure. For example, in the example of FIG. 19, in order to write data to the clone child differential file 2 19003, the file system program 3004 checks whether the clone child differential file 2 19003 has an update differential data or not. When there is no update differential file, the file system program 3004 checks the update differential data of the clone child differential file 1 19002.

If the update differential data does not exist to the root clone source file, the file system program 3004 performs a data write process to data blocks having no data written thereto. If an update differential data exists before reaching the root clone source file, the file system program 3004 executes the data update process.

In FIG. 23, at first, the file system program 3004 checks the flag 3010 of the last clone parent differential file or the last clone child differential file in step 23010. If the file is related to a clone file (step 13003: "Yes"), the file system program 3004 checks whether the file has data blocks or not (step 13005).

If the file has no data blocks (step 13005: "No"), the file system program 3004 retrieves the file metadata of the clone source file and checks if the clone source file is a root clone source file (step 23001).

If the file is a root clone source file (step 23001: "Yes"), the file system program 3004 assigns new data blocks to the last clone parent differential file or the last clone child differential file and performs the write process (step 13006 and subsequent steps).

On the other hand, if the clone source file is not a root clone source file (step 23001: "No"), the file system program 3004 retrieves the file metadata of the clone source file of that file, and checks if the file has data blocks (steps 23002 and 13005). If the file has data blocks (step 13005: "Yes"), the file system program 3004 executes the process of step 13009 and subsequent steps.

As described, the file system program 3004 follows the hierarchical structure of the clone file and updates the data if the file has data blocks. On the other hand, if the file has no data blocks, the file system program 3004 assigns new data blocks.

According to the above-described embodiment, the clone file can be created hierarchically in an arbitrary time.

Embodiment 3

The third embodiment relates to an example in which file cloning function creates clone files instead of copying data when a copy procedure (copy of the whole file) has been issued from the client. The time required for the copying process can be reduced significantly by creating clone files via the file cloning function. The copying procedure is supported for example via CIFS (Common Internet File System) and NFS (Network File System).

Figure 24:
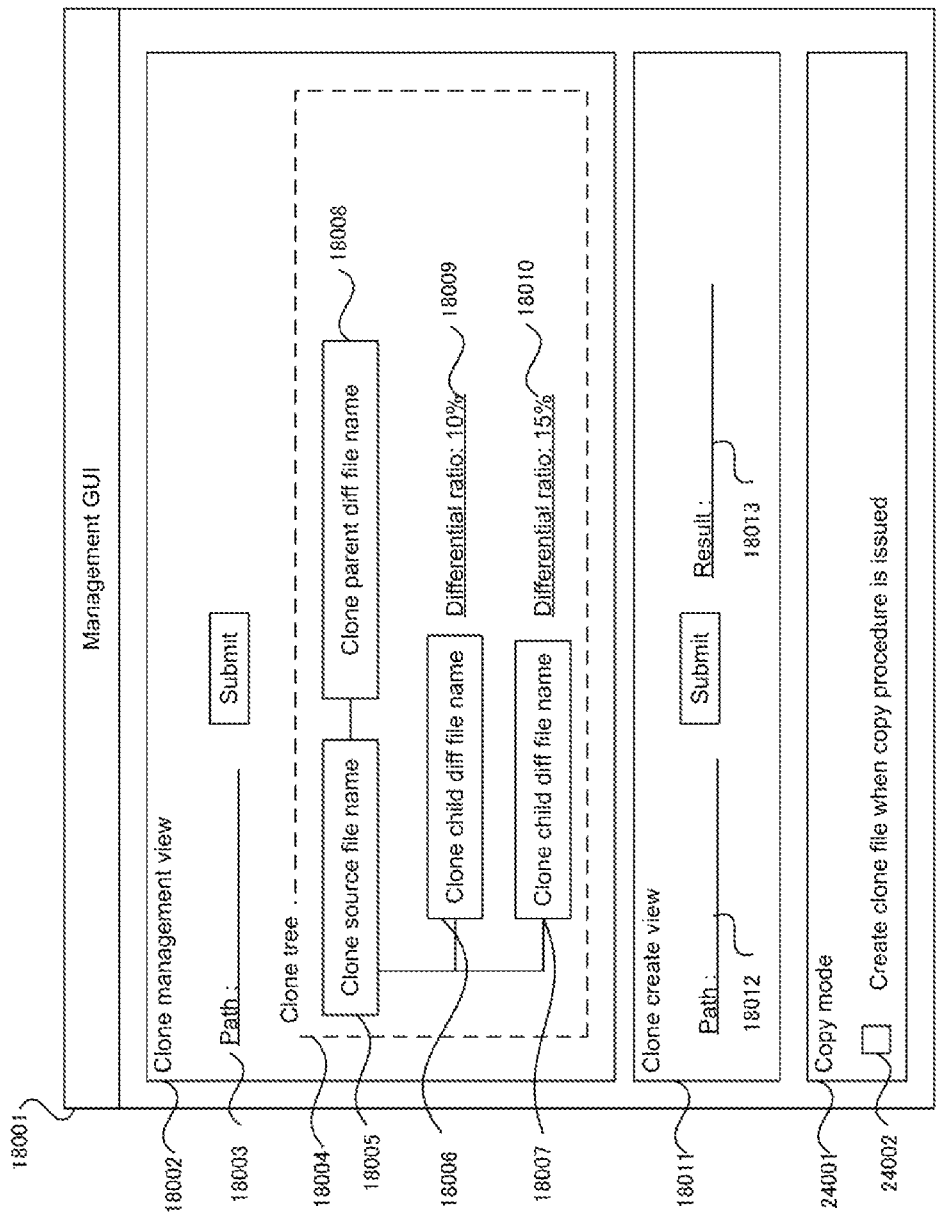
FIG. 24 is a view showing an example of a management GUI according to embodiment 3.

FIG. 24 illustrates an example of a management GUI 18001 that the management program 5002 of the management terminal 1005 provides to the administrators. The difference between FIG. 24 (present embodiment) and FIG. 18 (second embodiment) is that a box 24001 is provided for designating the copy mode.

When the administrator uses the management GUI 18001 to enter a check in a checkbox 24002 of a copy mode 24001, the file system program 3004 creates a clone file when a file is copied via the copy procedure. When the check box 24001 of the copy mode is set, the management program 5002 of the management terminal 1005 notifies the file system program 3004 of the file server 1003 that a copy mode has been set. The actual process will be described with reference to FIG. 25.

Figure 25:
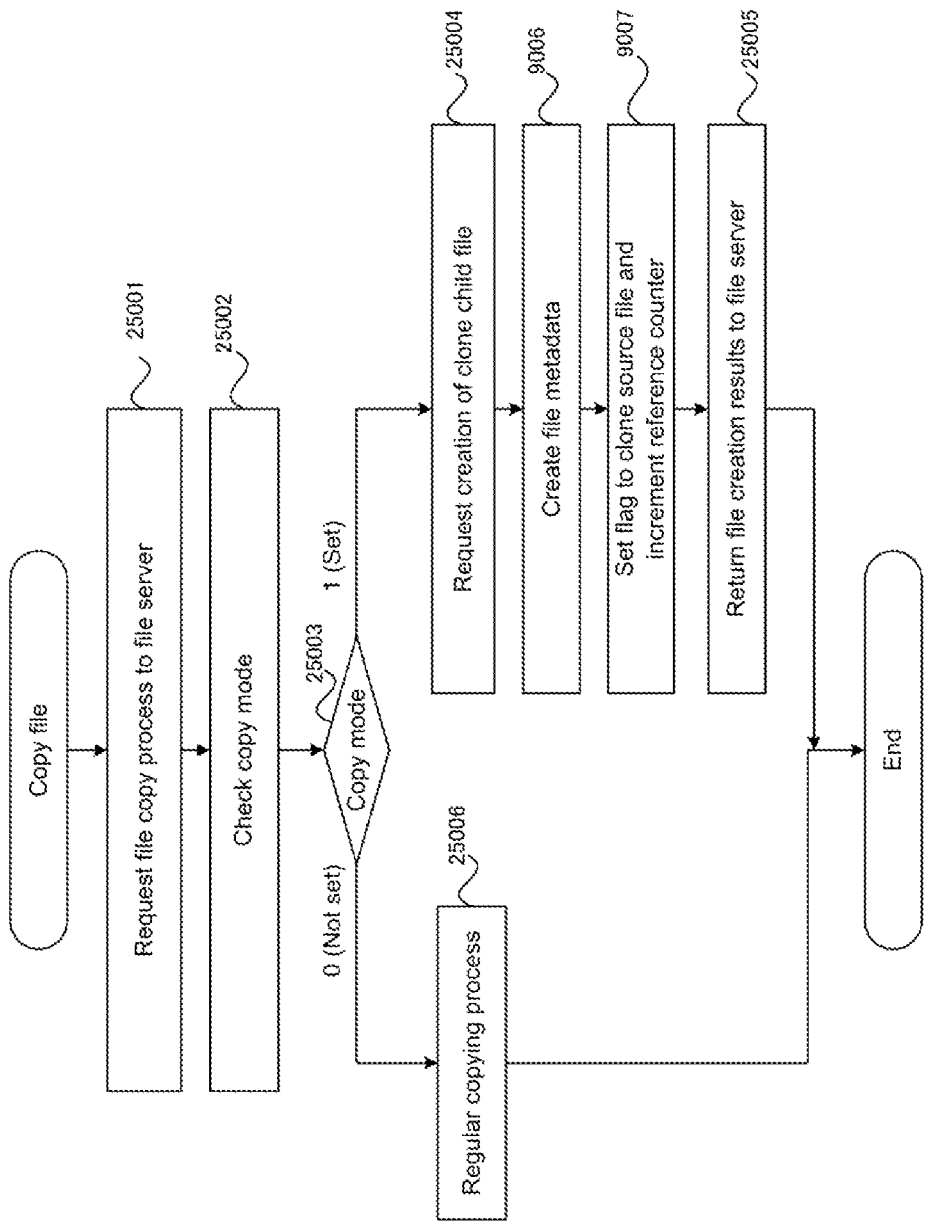
FIG. 25 is a flowchart showing an example of operation for copying files according to embodiment 3.

FIG. 25 is a flowchart showing how the file system program 3004 processes the copy procedure. The application program 2003 used by the end user (client) copies the file in the file server 1003 via the copy procedure. Then, the file access program 2004 sends a copy request to the file server via the copy procedure (step 25001).

The copy procedure includes a copy source file name and a copy destination file name, and the file server program 3003 executes the file copy process based on these file names. The file server program 3003 having received the copy request checks the copy mode (step 25002).

If the copy mode is "0" (meaning that the copy mode is not set) (step 25003: 0), the file server program 3003 performs a regular copying process (step 25006).

On the other hand, if the copy mode is "1" (meaning that the copy mode is set) (step 25003: 1), the file server program 3003 requests the file cloning program 3005 to create a clone child file (step 25004).

The file cloning program 3005 creates a metadata for the clone child file (step 9006), sets a flag to the clone source file and increments the reference counter (step 9007). The processes of steps 9006 and 9007 are the same as the process described in FIG. 9.

Finally in step 25005, the file cloning program 3005 notifies the result of creating the clone file to the file server program 3003. Then, the file server program 3003 notifies the creation results to the client (step 25005).

As described, when the client request a file copy process via a copy procedure, the time required for the copying process can be reduced significantly since the file server creates a clone file composed of only a portion of the data so that there is no need to copy all the data.

INDUSTRIAL APPLICABILITY

The present invention can be applied to information processing apparatuses such as large-scale computers, servers and personal computers, information/image storage apparatuses such as storage systems and HDD recorders, and communication apparatuses such as cellular phones.

REFERENCE SIGNS LIST

1001 Client
1002 Network switch
1003 File server
1004 Disk storage
1005 Management terminal
2001 CPU
2002 Memory
2003 Application program
2004 File access program
2005 Network interface
3001 CPU
3020 Network interface
3021 Storage interface
3002 Memory
3003 File server program
3004 File system program
3005 File cloning program
3006 File cloning management program
3007 File system management data
3008 File metadata
3009 bode
3010 Flag
3011 Data management table
3012 Minimum size
3013 Reference counter
3020 Source pointer
3021 Parent differential pointer
4001 CPU
4002 Memory
4003 Storage management program
4004 Disk controller
4005 Disk
4006 Storage interface
5001 CPU
5002 Memory
5002 Management program
5003 Management interface
5004 Network interface
6001, 6002 Data block
6003 Clone child file
6004 Clone parent file
6010 Clone parent differential file
6011 Clone source file
6012 Clone child differential file
7001 File
7002 File offset
7003 Start block position
7004 Block length
7010 Block
7021 Data area of file
7022 Hole
8001, 8002 Write
8003, 8004 Read
18001 Management GUI 18002 Clone management view
18011 Clone creation view
18003 Clone file path entry box
18004 Clone tree
18005 Clone source file display box
18008 Clone parent differential file display box
18006, 18007 Clone child differential file display box
18009, 18010 Differentiation ratio
18011 Clone creation view
18012 File path
18013 File creation number
18014 Execution result
19002 Clone child differential file 1
19004 Clone parent differential file 1
19003 Clone child differential file 2
19005 Clone parent differential file 2
24001 Copy mode
24002 Check box

The invention claimed is:

1. A file server connected to a client terminal and a storage system, the file server comprising:
a processor; and
a memory storing a file system program for managing a file;
wherein the file system program, upon receiving a copy request to create a copy of a source file,
if a copy mode is set, performs creating a clone of the source file, the clone virtually providing the same data of the source file to the client terminal and being enabled to receive update request from the client terminal, and
if the copy mode is not set, performs a regular copying process of the source file to copy all data of the source file,
wherein when creating the clone of the source file, the file system program
creates a first differential file based on the source file while inhibiting update of the source file, the first differential file indicating differences between the source file at the time of receiving the copy request and the clone of the source file,
accesses the first differential file in response to receiving an access request to the clone from said client terminal, thereby providing the clone of the source file to the client terminal;
wherein when the received access request is (1) an update request:
(1a) if a disk block of the storage system is not assigned to a file block of the first differential file designated via the update request, a disk block of the storage system is assigned to the file block and update data is written thereto;
(1b) if a disk block of the storage system is assigned to the file block, update data is written thereto;
wherein when the access request is (2) a read request:
(2a) if data exists in the file block of the first differential file designated via the read request, the data is read therefrom;
(2b) if there is no data in the file block, and if data exists in the file block corresponding to the source file, the data is read therefrom, and
when an update request to the source file is received from said client terminal,
a second differential file based on the source file is created,
a disk block of the storage system is assigned to the file block of the second differential file designated via the update request, and
update data is written thereto.

2. The file server according to claim 1, wherein the file system program
creates the second differential file together with the first differential file regardless of whether the update request of the source file occurs upon receiving the copy request of the source file, and accesses the second differential file upon receiving an access request to the source file;
wherein when the access request is (1) an update request:
(1a) if a disk block of the storage system is not assigned to a file block of the second differential file designated via the update request, a disk block of the storage system is assigned and update data is written thereto;
(1b) if a disk block is assigned to the file block, update data is written thereto;
wherein when the access request is (2) a read request:
(2a) if data exists in the file block of the second differential file designated via the read request, the data is read therefrom; and
(2b) if there is no data in the file block, and if data exists in the file block corresponding to the source file, the data is read therefrom.

3. The file server according to claim 1, wherein the file system program
creates a first data management table when a first update request is received to the first differential file after creating the first differential file; and
stores in the first data management table an offset of a file data including the update data, a start block position of a disk block of the storage system assigned to the file block of the first differential file designated via the update request, and a data block length of the file data.

4. The file server according to claim 1, wherein the file system program
creates a second data management table when a first update request is received to the second differential file after creating the second differential file; and
stores in the second data management table an offset of a file data including the update data, a start block position of a disk block of the storage system assigned to the file block of the second differential file designated via the update request, and a data block length of the file data.

5. The file server according to claim 2, wherein the file system program
creates a second data management table when a first update request is received to the second differential file after creating the second differential file; and
stores in the second data management table an offset of a file data including the update data, a start block position of a disk block of the storage system assigned to the file block of the second differential file designated via the update request, and a data block length of the file data.

6. The file server according to claim 1, wherein the first differential file has metadata, and the metadata includes information indicating that the first differential file is a clone.

7. The file server according to claim 1, wherein the file system program is designed to create the first differential file each time the copy request to create the clone of the source file is received if a copy mode is set; and wherein the source file has metadata, and the metadata includes information indicating that the source file is a source of the clone and a number of files of the first differential file.

8. The file server according to claim 1, wherein the file system program
(1) deletes the second differential file upon receiving a delete request of the source file, and sets the source file so that it is not visible from the client terminal; and
(2) deletes the first differential file upon receiving a delete request of the first differential file.

9. The file server according to claim 1, wherein
the file server is connected to a management terminal, and
the management terminal notifies the file system program that the copy mode is set.

10. A method for controlling a computer system comprising a storage system and a file server connected to a client terminal, the file server comprising a processor and a memory storing a file system program for managing a file, the method comprising:
receiving a copy request to create a copy of a source file;
if a copy mode is set, creating a clone of the source file upon receiving the copy request, the clone virtually providing the same data of the source file to the client terminal and being enabled to receive update request from the client terminal; and
if the copy mode is not set, performing a regular copying process of the source file to copy all data of the source file upon receiving the copy request,
wherein the step of creating the clone of the source file comprises:
creating a first differential file based on the source file while inhibiting update of the source file, the first differential file indicating differences between the source file at the time of receiving the copy request and the clone of the source file;
accessing the first differential file in response to receiving an access request to the clone from said client terminal, thereby providing the clone of the source file to the client terminal;
wherein when the received access request is (1) an update request:
(1a) if a disk block of the storage system is not assigned to a file block of the first differential file designated via the update request, assigning a disk block of the storage system to the file block, and update data being written thereto;
(1b) if a disk block of the storage system is assigned to the file block, update data being written thereto;
wherein when the access request is (2) a read request:
(2a) if data exists in the file block of the first differential file designated via the read request, the data being read therefrom;
(2b) if there is no data in the file block, and if data exists in the file block corresponding to the source file, the data being read therefrom, and
creating a second differential file based on the source file when an update request to the source file is received from said client terminal,
assigning a disk block of the storage system to the file block of the second differential file designated via the update request, and
writing update data thereto.

11. The method according to claim 10, wherein the step of creating the first differential file further comprising:
creating the second differential file together with the first differential file regardless of whether the update request of the source file occurs upon receiving the copy request of the source file; and
accessing the second differential file upon receiving an access request to the source file;
wherein when the access request is (1) an update request:
(1a) if a disk block of the storage system is not assigned to a file block of the second differential file designated via the update request, assigning a disk block of the storage system and writing update data thereto;
(1b) if a disk block is assigned to the file block, update data is written thereto;
wherein when the access request is (2) a read request:
(2a) if data exists in the file block of the second differential file designated via the read request, reading the data therefrom; and
(2b) if there is no data in the file block, and if data exists in the file block corresponding to the source file, reading the data therefrom.

12. The method according to claim 10 further comprising:
creating a first data management table when a first update request is received to the first differential file after creating the first differential file; and
storing in the first data management table an offset of a file data including the update data, a start block position of a disk block of the storage system assigned to the file block of the first differential file designated via the update request, and a data block length of the file data.

13. The method according to claim 10 further comprising:
creating a second data management table when a first update request is received to the second differential file after creating the second differential file; and
storing in the second data management table an offset of a file data including the update data, a start block position of a disk block of the storage system assigned to the file block of the second differential file designated via the update request, and a data block length of the file data.

14. The method according to claim 11 further comprising
creating a second data management table when a first update request is received to the second differential file after creating the second differential file; and
storing in the second data management table an offset of a file data including the update data, a start block position of a disk block of the storage system assigned to the file block of the second differential file designated via the update request, and a data block length of the file data.

15. The method according to claim 10, wherein the first differential file has metadata including information indicating that the first differential file is a clone.

16. The method according to claim 10, wherein the file server is configured to create the first differential file each time the copy request to create the clone of the source file is received if a copy mode is set; and
wherein the source file has metadata including information indicating that the source file is a source of the clone and a number of files of the first differential file.

17. The method according to claim 10 further comprising:
(1) deleting the second differential file upon receiving a delete request of the source file, and setting the source file so that it is not visible from the client terminal; and
(2) deleting the first differential file upon receiving a delete request of the first differential file.

18. The method according to claim 10, wherein the computer system further comprising a management terminal connected to the file server, and wherein the management terminal notifies the file server that the copy mode is set.

* * * * *